United States Patent
Sasaki

[19]

[11] Patent Number: 5,983,150
[45] Date of Patent: Nov. 9, 1999

[54] SUSPENSION SYSTEMS FOR MOTOR VEHICLES

[75] Inventor: Mitsuo Sasaki, Kanagawa, Japan

[73] Assignee: Unisia Jecs Corporation, Atsugi, Japan

[21] Appl. No.: 09/131,376

[22] Filed: Aug. 7, 1998

[30] Foreign Application Priority Data

Aug. 7, 1997 [JP] Japan ........................... 9-213036

[51] Int. Cl.[6] ................................................ G06G 7/76
[52] U.S. Cl. .................................... 701/48; 701/38
[58] Field of Search ............................ 701/48, 38, 79

[56] References Cited

FOREIGN PATENT DOCUMENTS 3-109114 A1    5/1991    Japan .

*Primary Examiner*—William A. Cuchlinski, Jr.
*Assistant Examiner*—Arthur D. Donnelly
*Attorney, Agent, or Firm*—Foley & Lardner

[57] ABSTRACT

A method of controlling a suspension system include sensing a behavior of a motor vehicle, producing a control signal in accordance with the behavior sensed, carrying out normal control of a damping-force characteristic of a shock absorber in accordance with the control signal produced and based on a predetermined damping-force characteristic curve, determining a brake operating state, determining a frictional coefficient of a road surface, determining a frequency input from the road surface, and reducing variations in a load of a wheel by controlling the damping-force characteristic of the shock absorber in accordance with the brake operating state, frictional coefficient, frequency determined.

22 Claims, 28 Drawing Sheets

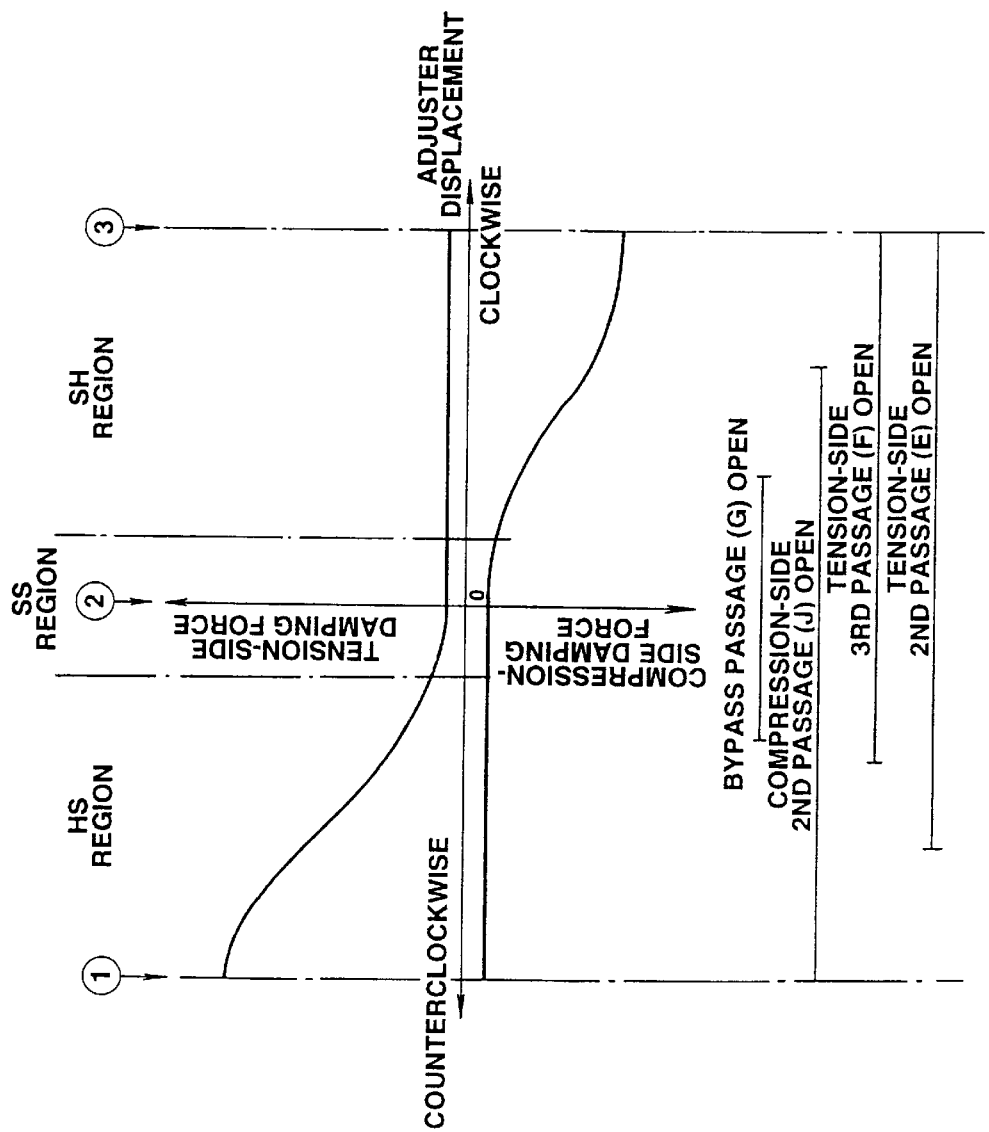

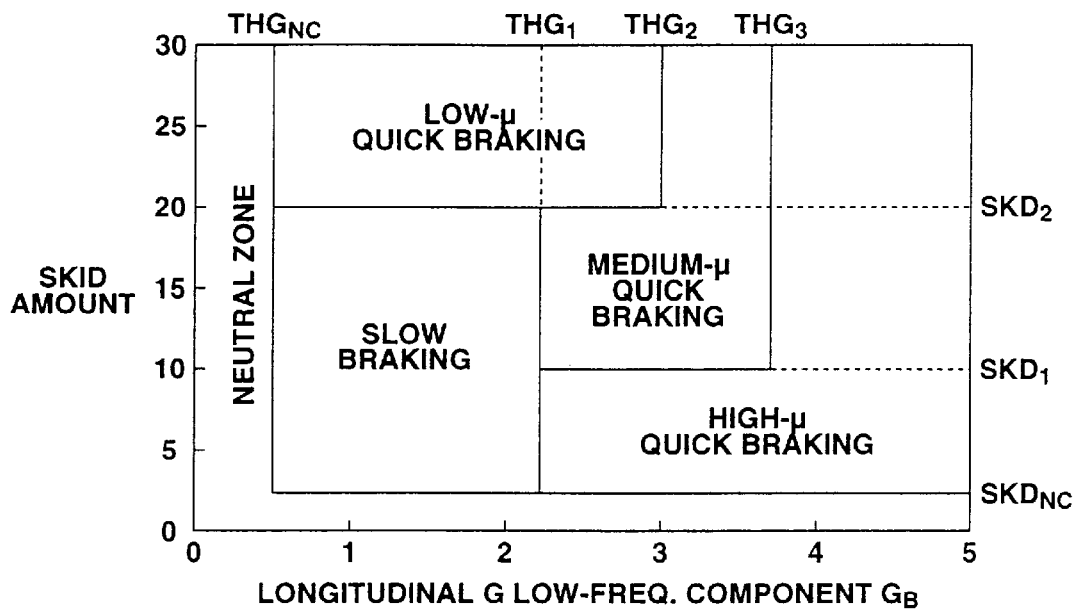

SUSPENSION SYSTEMS FOR MOTOR VEHICLES

BACKGROUND OF THE INVENTION

The present invention relates generally to suspension systems for motor vehicles which ensure improved braking performance of the vehicle during quick braking by control of the damping-force characteristic of shock absorbers.

Various suspension systems for motor vehicles are known which ensure improved braking performances of the vehicle during quick braking by control of the damping-force characteristic of shock absorbers. One of which is known in JP-A 3-109114 wherein control means are provided to vary the damping-force characteristic of a variable damping-force damper on the soft side during operation of a braking device. Specifically, control of the damping-force characteristic of the damper on the soft side during braking of the vehicle improves the pursuability of wheels with respect to the road surface, increasing the contact patch of the wheel. Thus, the road-surface frictional resistance which acts on the wheel is increased to effectively restrain a skid of the wheel, preventing lock of the wheel during braking of the vehicle.

However, the known system is constructed to control the damping-force characteristic of the damper always on the soft side during operation of the braking device regardless of other cruising conditions, producing the following problem:

With regard to an intermediate-frequency road wherein the road input frequency is principally in the band of an intermediate frequency between the resonance frequency of a sprung mass, i.e. mass above the spring and the resonance frequency of a unsprung mass, i.e. mass below the spring, control of the damping-force characteristic on the soft side is effective to improve the braking performance. However, with regard to a low-frequency road wherein the road input frequency is principally in the band of a low frequency corresponding to the sprung resonance frequency, and a high-frequency band wherein the road input frequency is principally in the band of a high frequency corresponding to the unsprung resonance frequency, such control enlarges variations of a sprung or unsprung mass, which increases wheel-load variations, resulting in deteriorated braking performance.

The reason will be described in detail. With regard to damper control during braking of the vehicle, a wheel load is one of the parameters of the suspension system which act on the braking system. Referring to FIG. 24, an influence of wheel-load variations upon the braking performance during antiskid control is such that with any road-surface frictional coefficient or road $\mu$, the greater is the wheel load, the longer is the braking distance. That is, a unique quantity of state which links the braking performance to the suspension performance is a wheel load, and its variations are variations of a sprung mass and a unsprung mass. And the braking distance tends to be prolonged with an increase in wheel-load variations.

In view of the fact that variations of the sprung mass and the unsprung mass are produced by a road input and an inertia force during braking of the vehicle, an influence of such conditions upon the braking performance will be described. When the sprung and unsprung masses vary with respect to road input, the braking performance is influenced by the damping-force characteristic of the damper. FIG. 25 shows a difference of the braking distance due to a difference of the damping-force characteristic and the input frequency. As seen in FIG. 25, when the input frequency is low, the soft damping-force characteristic damper has a longer braking distance. When the input frequency is between about 1.2 and 4.0 Hz, the hard damping-force characteristic damper has a longer braking distance. When the input frequency is 10.0 Hz or more the soft damping-force characteristic damper has a longer braking distance. It is understood that this reflects the transfer characteristic of the suspension system between the road surface and the sprung or unsprung mass. That is, in order to obtain optimum wheel-load variations with respect to road input by damper control, it is necessary to determine the road-surface conditions, i.e. the road input frequency.

Skyhook control will be described which is one of the effective means for insulating vibrations input from the road surface. As seen from its theoretical formula, skyhook control is a control to minimize variations of kinetic and potential energies of the sprung mass, and therefore it is effective for an improvement in the braking performance when a wheel load varies with variations of the sprung mass. However, when variations of the unsprung mass are active mainly as shown in FIG. 25, skyhook control is not concerned in a restraint of variations of the unsprung mass. Thus, control should also be carried out to restrain variations of the unsprung mass. Damper control for restraining variations of the unsprung mass can be obtained by increasing a damping coefficient. However, when applied to the road surface wherein variations of the unsprung mass are not active mainly, this control deteriorates the braking performance at the input frequency between about 1.2 and 4.0 Hz as described above.

It is thus understood that it is necessary to determine the conditions of the road surface on which the vehicle cruises, i.e. the road input frequency, as described above.

With regard to wheel-load variations produced by an inertia force which is active during braking of the vehicle, the magnitude of the inertia force corresponds to that of a braking force which is determined by how intense a driver depresses a brake pedal and how skiddy the road surface is. Thus, needed are determination of the brake operating state which indicates the operation amount of the brake pedal depressed by a driver and determination of the road $\mu$ which indicates the skidding degree of the road surface.

It is, therefore, an object of the present invention to provide suspension systems for motor vehicles which ensure optimum control of the braking performance in all conditions.

SUMMARY OF THE INVENTION

One aspect of the present invention lies in providing a method of controlling a suspension system for a motor vehicle with a brake and an antiskid controller, the suspension system including a shock absorber arranged between a vehicle body and a wheel and having a device for allowing a change in a damping-force characteristic, the method comprising the steps of:

sensing a behavior of the motor vehicle;

producing a control signal in accordance with said behavior sensed;

carrying out normal control of the damping-force characteristic of the shock absorber in accordance with said control signal produced and based on a predetermined damping-force characteristic curve;

determining a brake operating state;

determining a frictional coefficient of a road surface;

determining a frequency input from said road surface; and reducing variations in a load of the wheel by controlling the damping-force characteristic of the shock absorber in accordance with said braking operating state, frictional coefficient, frequency determined.

BRIEF DESCRIPTION OF THE DRAWINGS

FIG. 6 is a diagram showing the characteristic of damping force vs. pulse-motor stepping position;

FIG. 22 is a map illustrating determination of the road-surface frictional coefficient and the brake operating state;

FIG. 23 is a view similar to FIG. 22, illustrating switching between normal control and braking control;

DETAILED DESCRIPTION OF THE INVENTION

Figure 1:
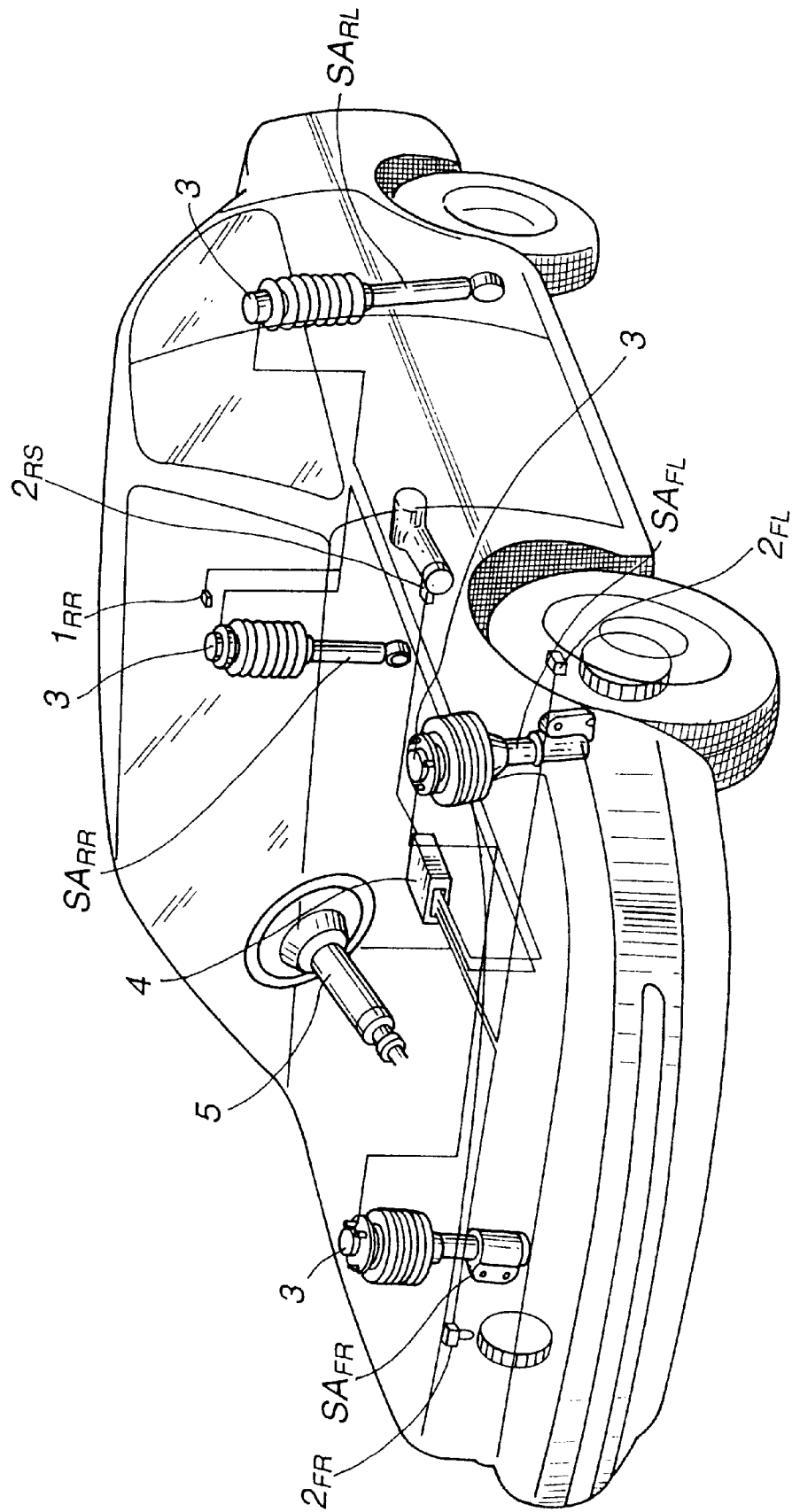
FIG. 1 is a perspective view showing a motor vehicle with a suspension system embodying the present invention.

Referring to the drawings wherein like reference numerals designate like parts throughout the views, a suspension system for motor vehicles embodying the present invention will be described.

FIGS. 1–19 show a first embodiment of the present invention. Referring to FIG. 1, a suspension system comprises four shock absorbers $SA_{FR}, SA_{FL}, SA_{RR}, SA_{RL}$, each being arranged between a vehicle body and a corresponding wheel. Note that the shock absorbers will be designated by SA simply when indicating the assemblage and explaining the common structure. Also note that subscripts FR, FL, RR, RL designate front-right, front-left, rear-right, and rear-left wheel, respectively. Moreover, the suspension system comprises a vertical acceleration sensor (refer hereafter to as a vertical G sensor) 1, ($1_{FR}, 1_{FL}, 1_{RR}$, arranged with the vehicle body in the vicinity of each shock absorber $SA_{FR}, SA_{FL}, SA_{RR}$ to sense a vertical acceleration G, a wheel-speed sensor 2 ($2_{FR}, 2_{FL}, 2_{RR}$) arranged with the front-right, and front-left wheels and a rear deflector to sense speeds $W_{V-FR}, W_{V-FL}$ of the front-right and front-left wheels and a speed $W_{V-RS}$ of the rear wheel, a brake-lamp switch BS, not shown in FIG. 1, for sensing braking of a vehicle in accordance with operation of a brake pedal, and a control unit 4 arranged in the vicinity of a driver's seat to output a drive control signal to a pulse motor 3 for the shock absorber SA in accordance with a signal out of the vertical G sensor 1.

Figure 2:
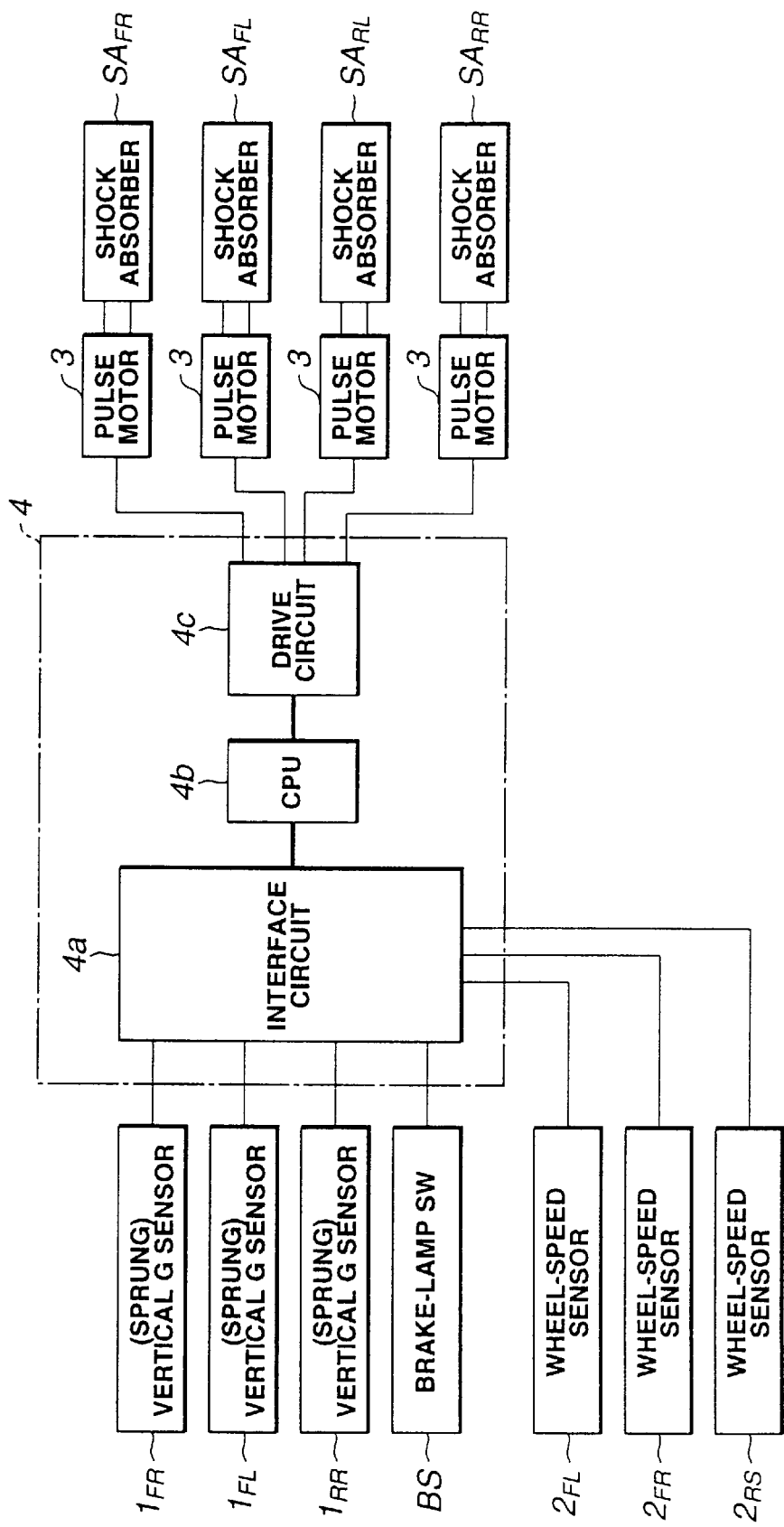
FIG. 2 is a block diagram showing a first embodiment of the present invention.

Referring to FIG. 2, the control unit 4 includes an interface circuit 4a, a central processing unit (CPU) 4b, and a drive circuit 4c. The interface circuit 4a receives a signal of the sprung vertical acceleration G derived from the vertical G sensor 1, a signal of the wheel speed Wv derived from the wheel-speed sensor 2, a on-off signal derived from the brake-lamp switch BS. In accordance with those signals, the control unit 4 carries out control of the damping-force characteristic of the shock absorber SA, which will be described later in detail.

Figure 3:
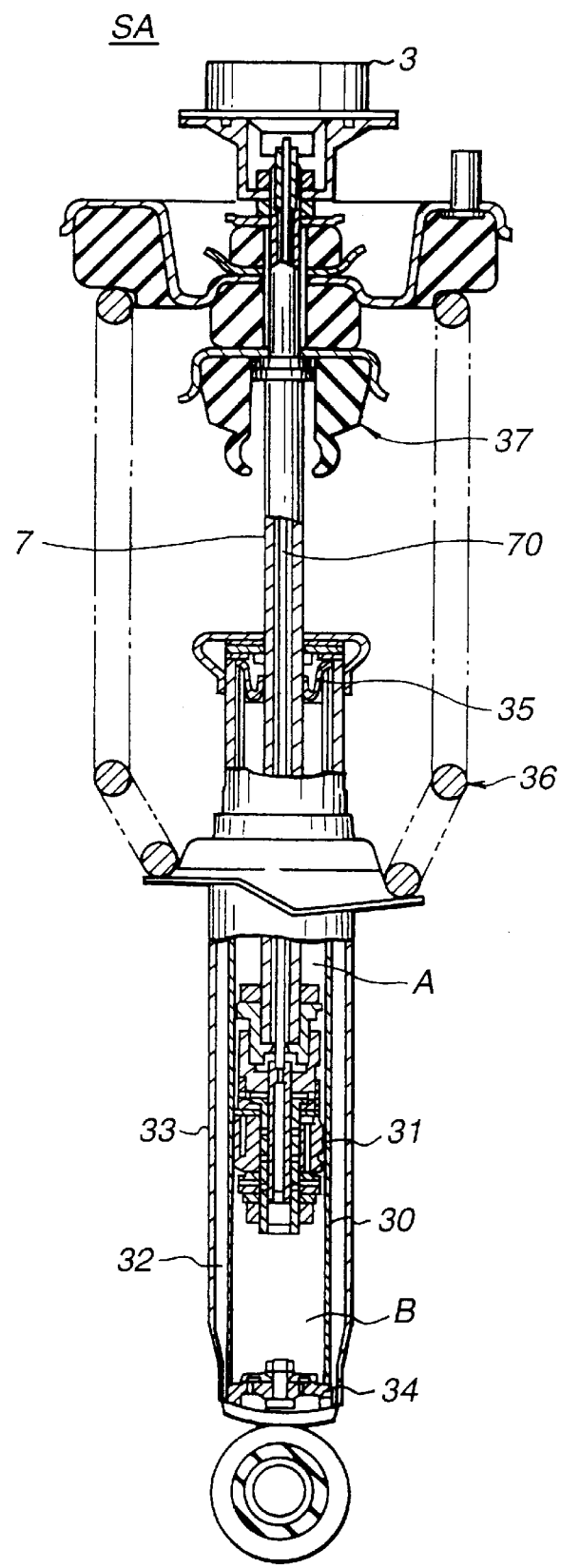
FIG. 3 is a longitudinal section showing a shock absorber.

Referring to FIG. 3, the shock absorber SA includes a cylinder 30, a piston 31 for defining an upper and lower chambers A, B in the cylinder 30, an outer tube 33 for defining a reservoir 32 at the outer periphery of the cylinder 30, a base 34 for defining the lower chamber B and the reservoir 32, a guide member 35 for guiding slide movement of a piston rod 7 connected to the piston 31, a suspension spring 36 interposed between the outer tube 33 and the vehicle body, and a bumper rubber 37.

Figure 4:
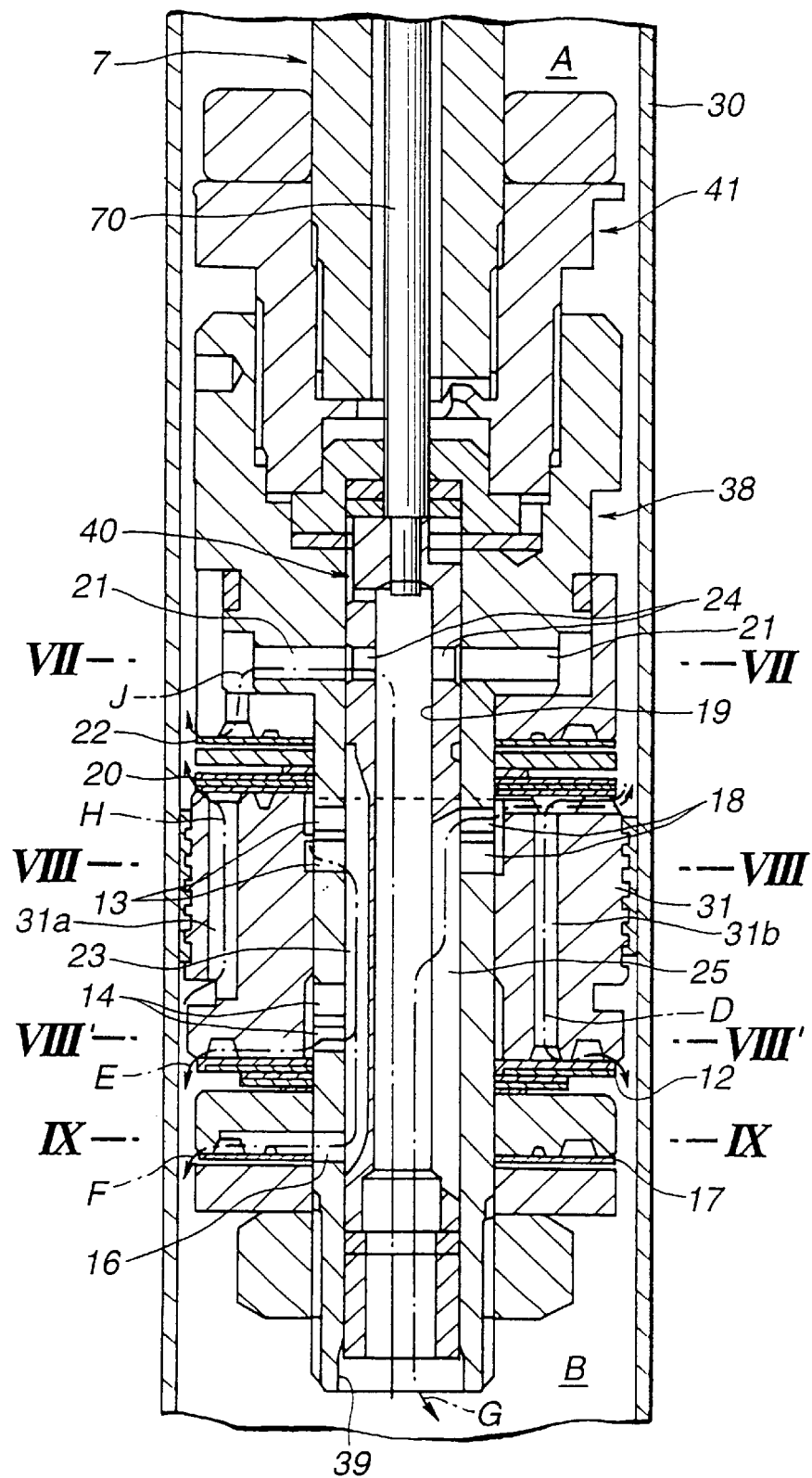
FIG. 4 is an enlarged fragmentary section showing the shock absorber.

Referring to FIG. 4, the piston 31 is formed with through holes 31a, 31b. Compression-side and tension-side damping valves 20, 12 are arranged to close the through holes 31a, 31b, respectively. A stud 38 arranged through the piston 31 is engaged with and fixed to a bound stopper 41 engaged with the head of the piston rod 7. The stud 38 is formed with a communication hole 39 which forms a passage for communication between the upper and lower chambers A. B in bypassing the through holes 31a, 31b, i.e. a tension-side second passage E, a tension-side third passage F, a bypass passage G, and a compression-side second passage J as will be described later. An adjuster 40 is rotatably arranged in the communication hole 39 to vary the sectional area of the passage. Tension-side and compression-side check valves 17, 22 are arranged at the outer periphery of the stud 38 to allow and interrupt fluid flow on the side of the passage formed by the communication hole 39 in the direction of fluid flow. As shown in FIG. 3, the adjuster 40 is rotated by the pulse motor 3 through a control rod 70. Moreover, the stud 38 is formed with first, second, third, fourth, and fifth ports 21, 13, 18, 14, 16 in descending order.

The adjuster 40 is formed with a hollow 19, first and second transverse holes 24, 25 for communication between the inside and outside, and a longitudinal groove 23 formed on the outer periphery.

Four passages are formed between the upper and lower chambers A, B to allow fluid flow in the tension stroke: a tension-side first passage D which extends to the lower chamber B via the through the hole 31b and the tension-side damping valve 12 with the inside opened; a tension-side second passage E which extends to the lower chamber B via the second port 13, the longitudinal groove 23, the fourth port 14, and the tension-side damping valve 12 with the outer periphery opened; a tension-side third passage F which extends to the lower chamber B via the second port 13, the longitudinal hole 23, the fifth port 16 and the tension-side check valve 17 opened; and a bypass passage G which extends to the lower chamber B via the third port 18, the second transverse hole 25, and the hollow 19. Three passages are formed between the upper and lower chambers A, B to allow fluid flow in the compression stroke: a compression-side first passage H which extends to the upper chamber A via the through hole 31a and the compression-side damping valve 20 opened; a compression-side second passage J which extends to the upper chamber A via the hollow 19, the first transverse hole 24, the first port 21, and the compression-side check valve 22 opened; and the bypass passage G which extends to the upper chamber A via the hollow 19, the second transverse hole 25, and the third port 18.

Figure 5:
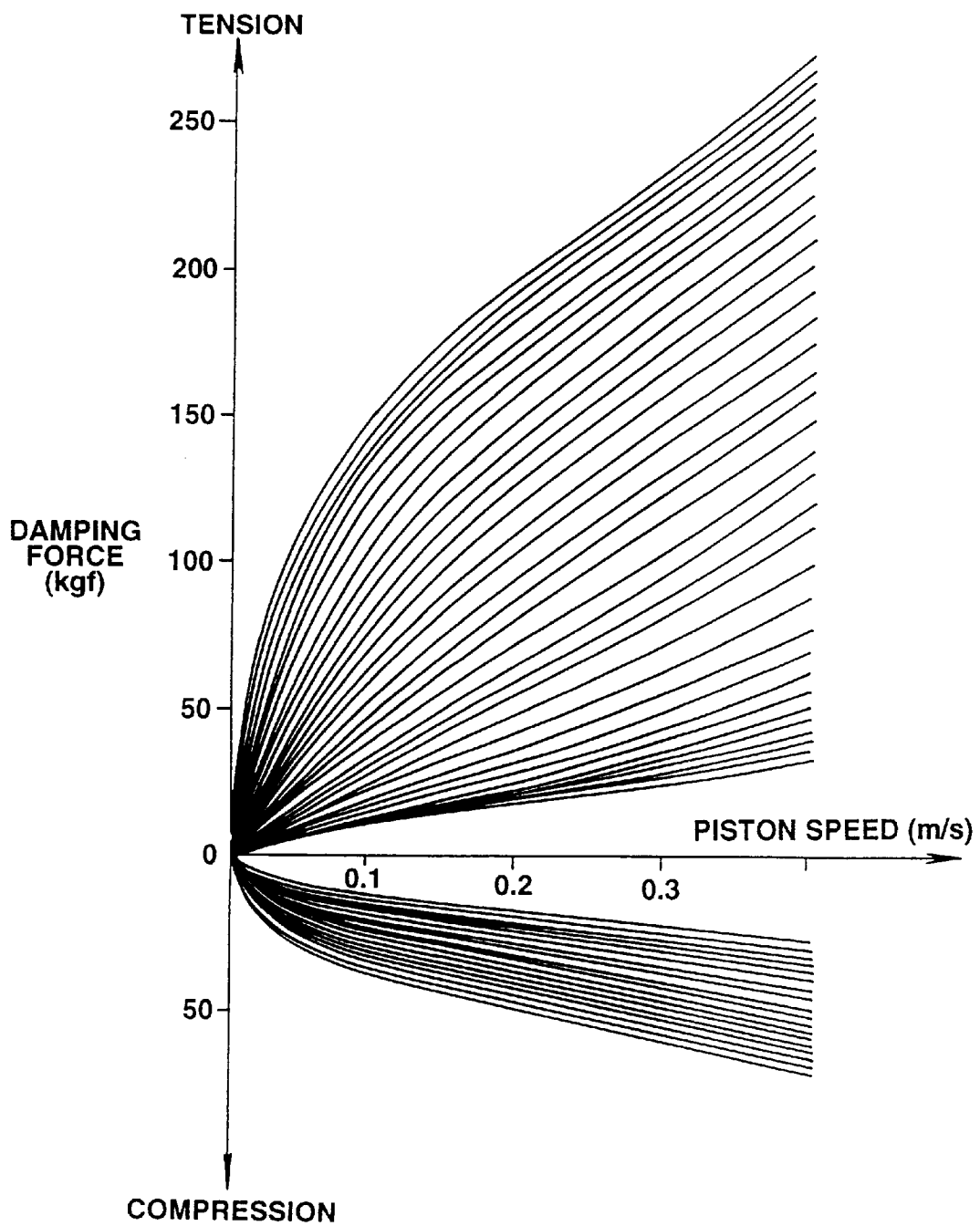
FIG. 5 is a graph showing the characteristic of damping force vs. piston speed.
Figure 7A:
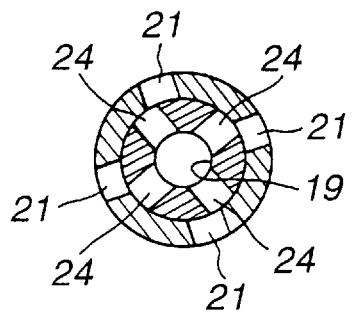
FIGS. 7A–7C are sectional views taken along the line VII—VII in FIG. 4.
Figure 7B:
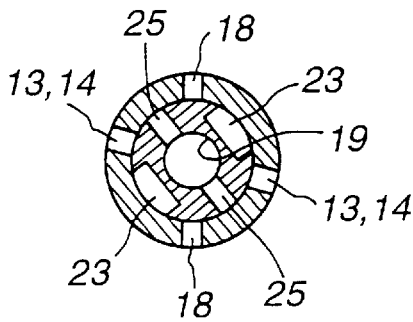
Figure 7C:
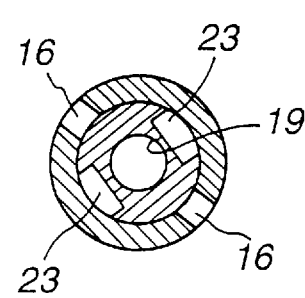
Figure 8A:
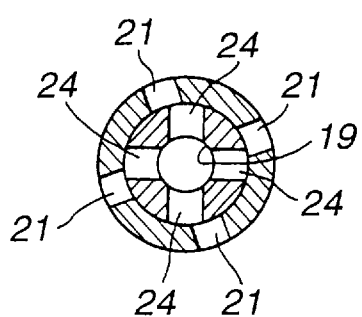
FIGS. 8A–8C are views similar to FIG. 7C, taken along the lines VIII—VIII and VIII'–VIII' in FIG. 4.
Figure 8B:
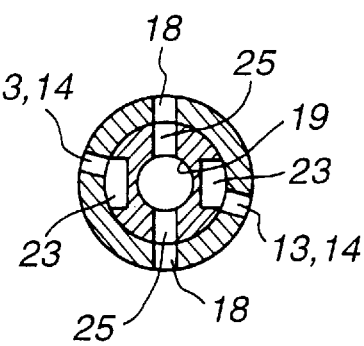
Figure 8C:
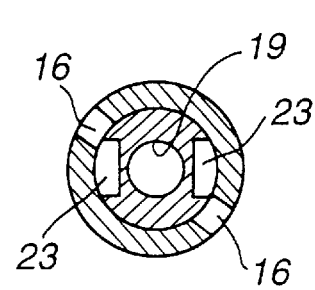
Figure 9A:
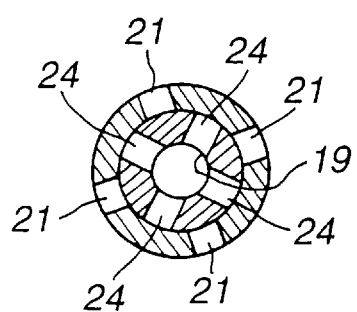
FIGS. 9A–9C are views similar to FIG. 8C, taken along the line IX—IX in FIG. 4.
Figure 9B:
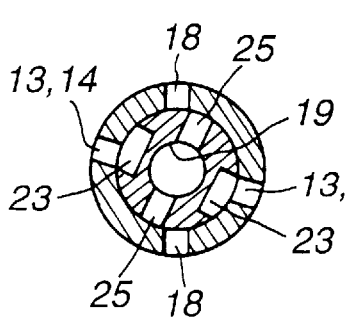
Figure 9C:
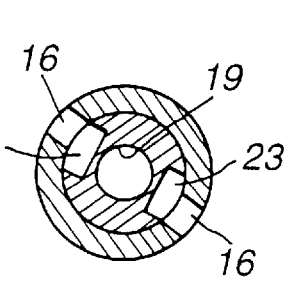

Thus, the shock absorber SA is constructed so that rotation of the adjuster 40 can vary the damping-force characteristic in the multistage way with respect to both the tension and compression sides as shown in FIG. 5. Specifically, referring to FIG. 6, when rotating the adjuster 40 counterclockwise with both the tension and compression sides set in the soft state (refer hereafter to as a soft region SS), the tension-side damping-force characteristic can be varied in the multistage way, whereas the compression-side damping-force characteristic is fixed in a low damping-force region (refer hereafter to as a tension-side hard region HS). On the other hand, when rotating the adjuster 40 clockwise, the compression-side damping-force characteristic can be varied in the multistage way, whereas the tension-side damping-force characteristic is fixed in a low damping-force region (refer hereafter to as a compression-side hard region SH).

Figure 10:
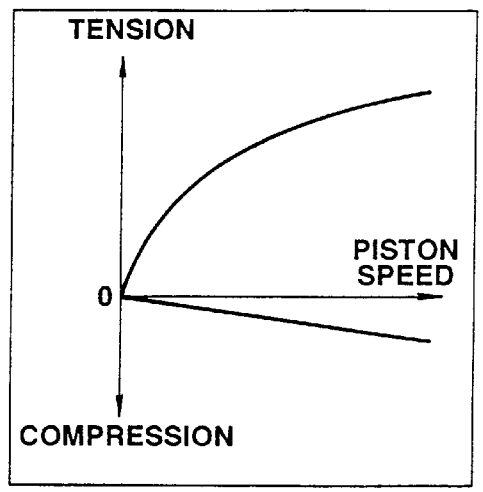
FIG. 10 is a view similar to FIG. 5, showing the damping-force characteristic in the tension-side hard state.
Figure 11:
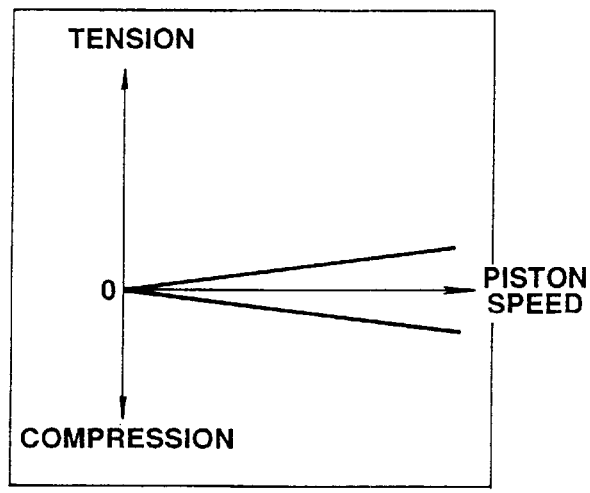
FIG. 11 is a view similar to FIG. 10, showing the damping-force characteristic in the tension-side and compression-side soft states.
Figure 12:
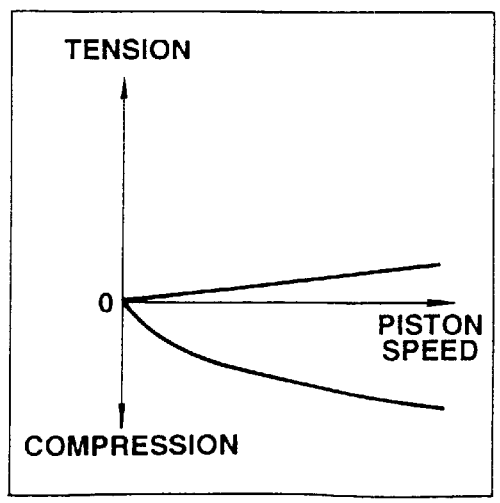
FIG. 12 is a view similar to FIG. 11, showing the damping-force characteristic in the compression-side hard state.

FIGS. 7A–7C, 8A–8C, and 9A–9C show sectional views taken along the lines VII—VII, VIII—VIII and VIII'—VIII', and IX—IX in FIG. 4, respectively, when the adjuster 40 is put in positions ①, ②, ③. FIGS. 10–12 show the damping-force characteristics in the positions ①, ②, ③, respectively.

Figure 13:
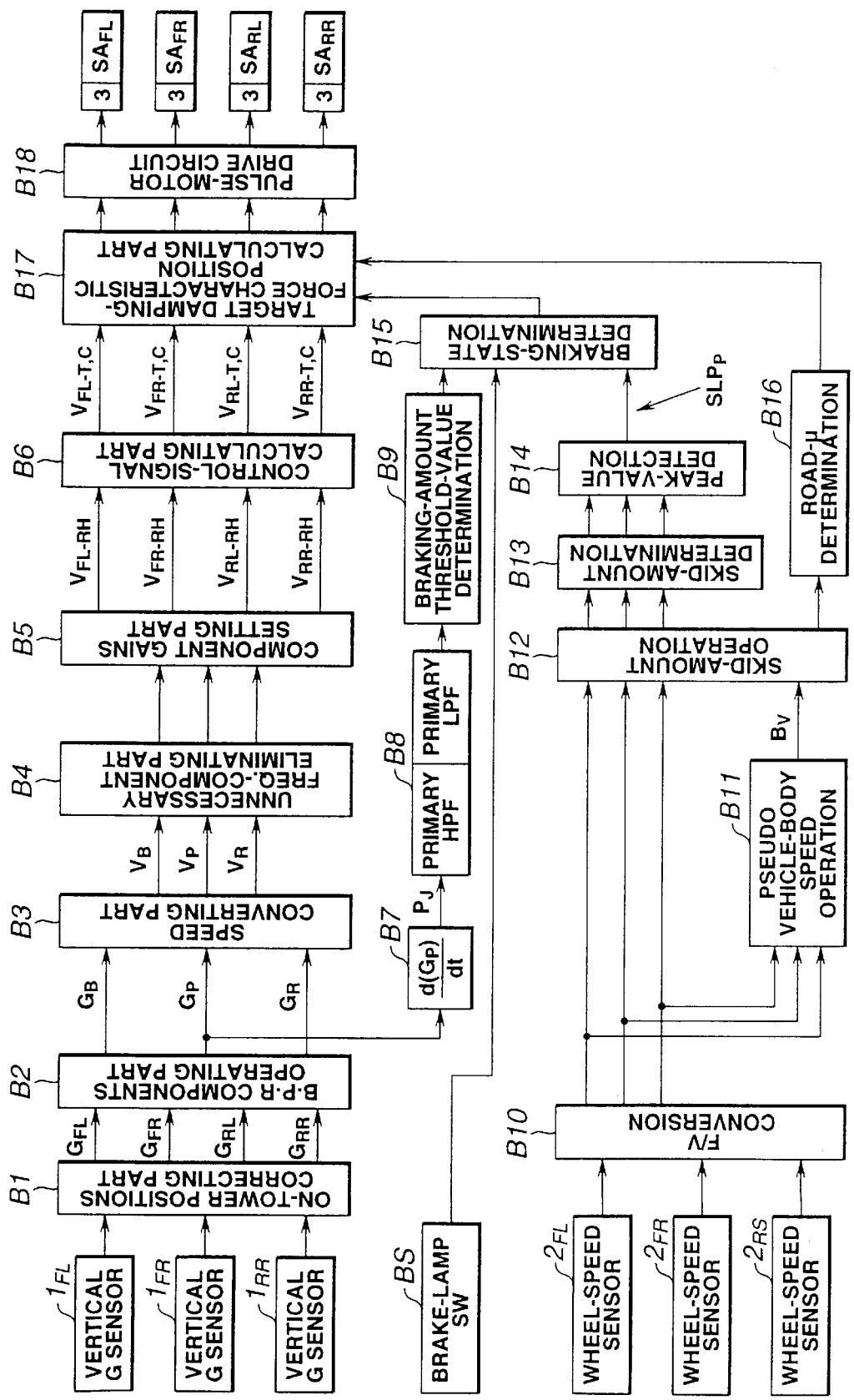
FIG. 13 is a view similar to FIG. 2, showing the content of damping-force characteristic controlling means in a control unit.

Referring to FIG. 13, a description will be made with regard to damping-force characteristic controlling means in the control unit 4.

At a block B1 (wheel on-tower positions correcting part), in accordance with vertical accelerations of the vehicle body in the vicinity of the shock absorbers $SA_{FR}, SA_{FL}, SA_{RR}$ sensed by the vertical G sensors $1_{FR}, 1_{FL}, 1_{RR}$, vertical accelerations $G_{FR}, G_{FL}, G_{RR}, G_{RL}$ on wheel towers are calculated.

At block B2 (B·P·R components operating part), the on-tower vertical acceleration G ($G_{FR}, G_{FL}, G_{RR}, R_{RL}$) serves as a bounce component $G_B(G_{FR-B}, G_{FL-B}, G_{RR-B}, G_{RL-B})$ in the tower position. Moreover, pitch and roll components $G_F, G_R$ of the vehicle are obtained in accordance with formulas (1) and (2):

$$G_F = (G_{FR} + G_{FL}) - (G_{RR} + G_{RL}))/2 \qquad (1)$$

$$G_R = (G_{FR} - G_{FL})/2 \qquad (2)$$

At block B3 (speed converting part), and bounce components $G_{FR-B}, G_{FL-B}, G_{RR-B}, G_{RL-B}$, the pitch component $G_P$, and the roll component $G_R$ resulting from the sprung vertical accelerations are integrated or passed through low-pass filters, respectively, for conversion into a bounce component ($V_B(V_{FR-B}, V_{FL-B}, V_{RR-B}, V_{RL}B)$, a pitch component $V_P$, and a roll component $V_R$ resulting from the sprung vertical speed.

At block B4 (unnecessary frequency-component eliminating part), using a band-pass filter BPF, a processing is carried out to increase insulation of signals which are not in a target frequency band to be controlled.

With regard to signals of the above components, note that a positive value corresponds to the upward direction, and a negative value corresponds to the downward direction.

At block B5 (component-gains setting part), bounce gains $\alpha_f, \alpha_r$, pitch gains $\beta_f, \beta_r$, roll gains $r_f, r_r$ are independently set for the front and rear wheels. Moreover, a processing is carried out to obtain a signal $V_J(V_{FR-RH}, V_{FR-LH}, V_{RR-RH}, V_{RR-LH})$ of the sprung vertical speed component in the tower position in accordance with formulas (3)–(6):

Front-right wheel $V_{FR-RH} = \alpha_f V_{FR-B} + \beta_f V_P + r_f V_R$ (3)

Front-left wheel $V_{FR-LH} = \alpha_f V_{FL-B} + \beta_f V_P - r_f V_R$ (4)

Rear-right wheel $V_{RR-RH} = \alpha_f V_{RR-B} - \beta_f V_P + r_r V_R$ (5)

Rear-left wheel $V_{RR-LH} = \alpha_f V_{RL-B} - \beta_f V_P - r_r V_R$ (6)

At a block B6 (control-signal calculating part), a control signal V (tension-side control signals $V_{FR-T}, V_{FL-T}, V_{RR-T}, V_{RL-T}$ and compression-side control signals $V_{FR-C}, V_{FL-C}, V_{RR-C}, V_{RL-C}$) is obtained from the sprung component signal $V_u(V_{FR-RH}, V_{FR-LH}, V_{RR-RH}, V_{RR-LH})$ based on the sprung vertical speed $\Delta x$ obtained at the blocks B1–B5 and in accordance with formulas (7a)–(10a) and (7b)–(10b):

| | | |
|---|---|---|
| Front-right wheel | $V_{ra-T} = g_f * V_{PR-RK}$ | ... (7a) |
| | $V_{FR-C} = g_r * V_{ER-RE}$ | ... (7b) |
| Front-left wheel | $V_{FL-T} = g_f * V_{ER-LH}$ | ... (8a) |
| | $V_{FL-C} = g_r * V_{FR-LH}$ | ... (8b) |
| Rear-right wheel | $V_{RR-T} = g_f * V_{RR-RH}$ | ... (9a) |
| | $V_{RR-C} = g_r * V_{RR-RH}$ | ... (9b) |
| Rear-left wheel | $V_{RC-T} = g_f * V_{RR-LH}$ | ... (10a) |
| | $V_{RC-C} = g_r * V_{RR-LH}$ | ... (10b) | where $g_f$ is a tension-side total gain, and $g_r$ is a compression-side total gain.

At block B7, the pitch component $G_P$ obtained at the block B2 is differentiated to obtain a pitch jerk or differential acceleration PJ. At a block B8, using primary high-pass and low-pass filters HPF, LPF, a processing is carried out to eliminate frequency components which are not in a required frequency band. At a block B9 (braking-amount threshold-value determination), determination is made as to whether or not a peak value PJp of the pitch differential acceleration PJ is greater than a predetermined threshold value $PJ_{TH}$.

At a block B10 (F/V conversion), a speed pulse signal out of the wheel-speed sensor 2 ($2_{FR}, 2_{FL}, 2_{RS}$) is converted into a signal of a wheel speed $W_V(W_{V-FR}, W_{V-FL}, W_{V-RS})$. At a block B11 (pseudo vehicle-body speed operation), a maximum value of the signal of the wheel speed $W_V(W_{V-FR}, W_{V-FL}, W_{V-RS})$ is obtained, based on which a (pseudo) vehicle-body speed $B_v$ is calculated. At a block B12 (skid-amount operation), a skid amount SKD (=vehicle-body speed $B_v$31 wheel speed $W_v$) is calculated. At a block B13 (skid-amount determination), determination is made as to whether or not the skid amount SKD is greater than a predetermined skidding-state determination threshold value $SKD_{TH}$. If the skid amount SKD is greater than the threshold value $SKD_{TH}$, a skid determination flag is turned on. Then, determination is made as to whether or not the skid amount SKD is smaller than a predetermined neutral-zone threshold value $SKD_{TL}$. If the skid amount SKD is smaller than the threshold value $SKD_{TL}$, a one antiskid control cycle completion flag is turned on. At a block B14 (peak-value detection), a peak value SKDp of the skid amount SKD is obtained.

At a block B15 (brake operating state determination) subsequent to the blocks B9 and B14, the brake operating state is determined. At a block B16 (road-$\mu$ determination) subsequent to the block B12, the road $\mu$ is determined.

Figure 14:
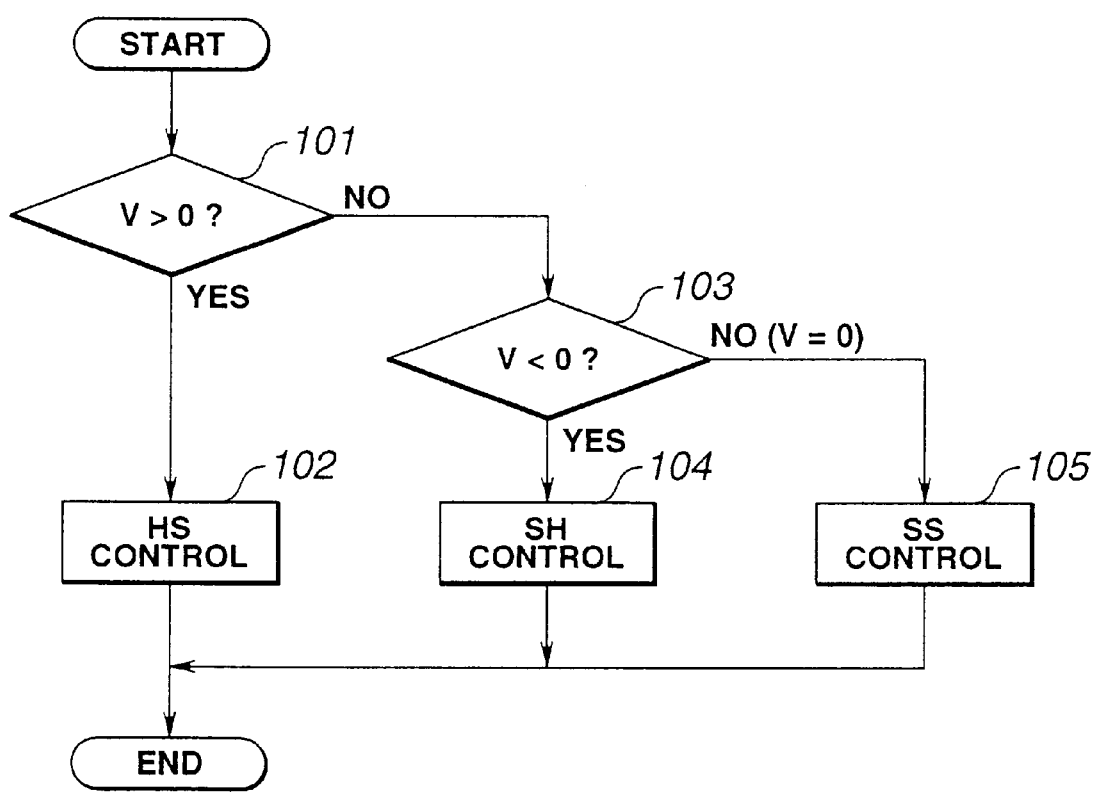
FIG. 14 is a flowchart showing control of the damping-force characteristic during normal control.
Figure 16:
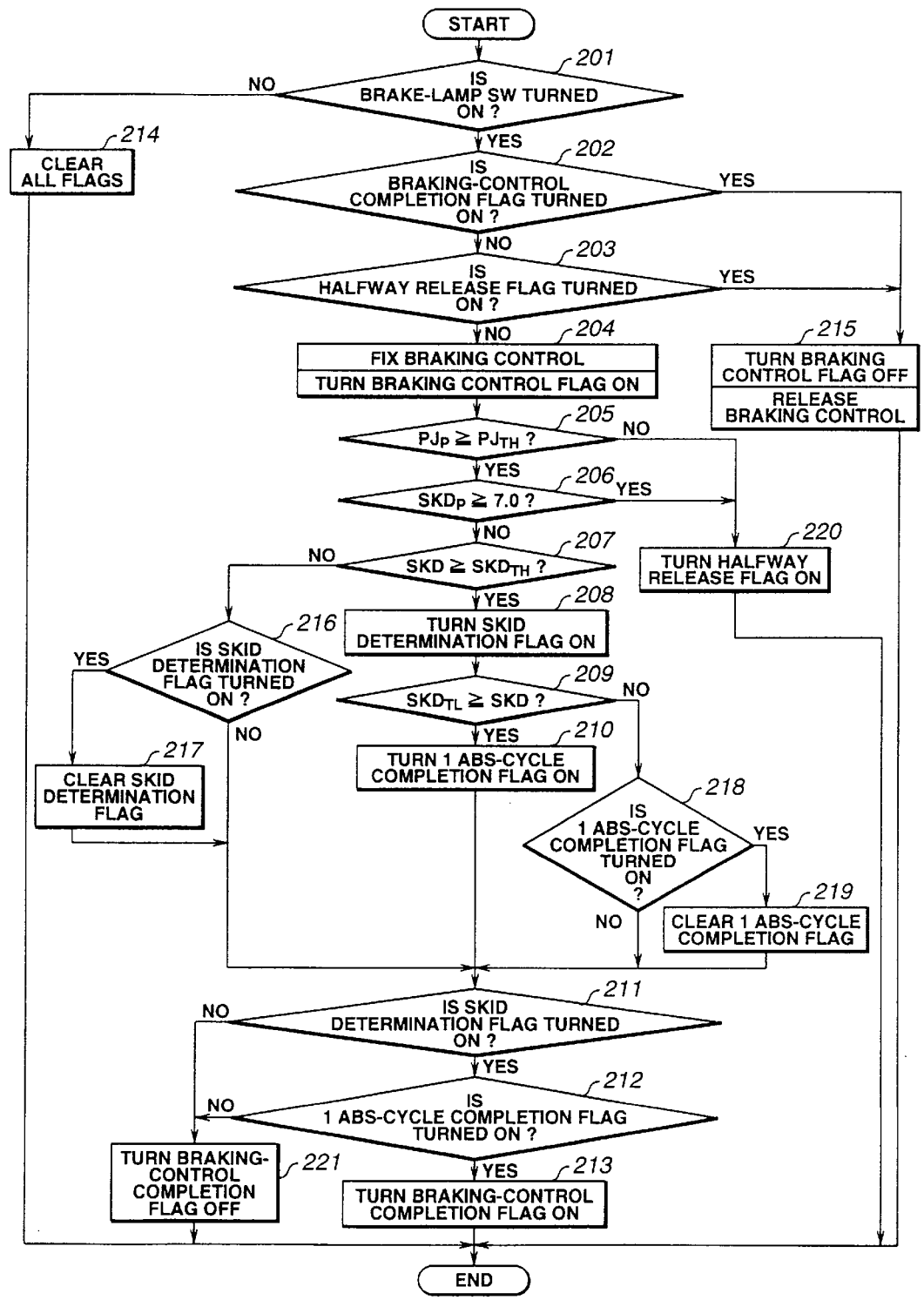
FIG. 16 is a view similar to FIG. 14, showing switching between normal control and braking control.

At a block B17 (target damping-force characteristic position calculating part) subsequent to the blocks B6, B15, and B16, a target damping-force characteristic position P ($P_T, P_C$) or control damping coefficient C of the shock absorber SA during normal control is calculated from the control signal V ($V_{FR-T}, V_{FL-T}, V_{RR-T}, V_{RL-T}$ and $V_{FR-C}, V_{FL-C}, V_{RR-C}, V_{RL-C}$) in accordance with a flowchart as shown in FIG. 14. Moreover, correction control during braking of the vehicle and correction control during cruising on a bad road are carried out in accordance with a flowchart as shown in FIG. 16. With regard to the damping-force characteristic, normal control, correction control during braking of the vehicle, and correction control during cruising on a bad road will be described later in detail.

At a block B18 (pulse-motor drive circuit), a drive signal is provided to the pulse motor 3 so as to drive the shock absorber SA to the target damping-force characteristic position P ($P_T, P_C$).

Figure 15:
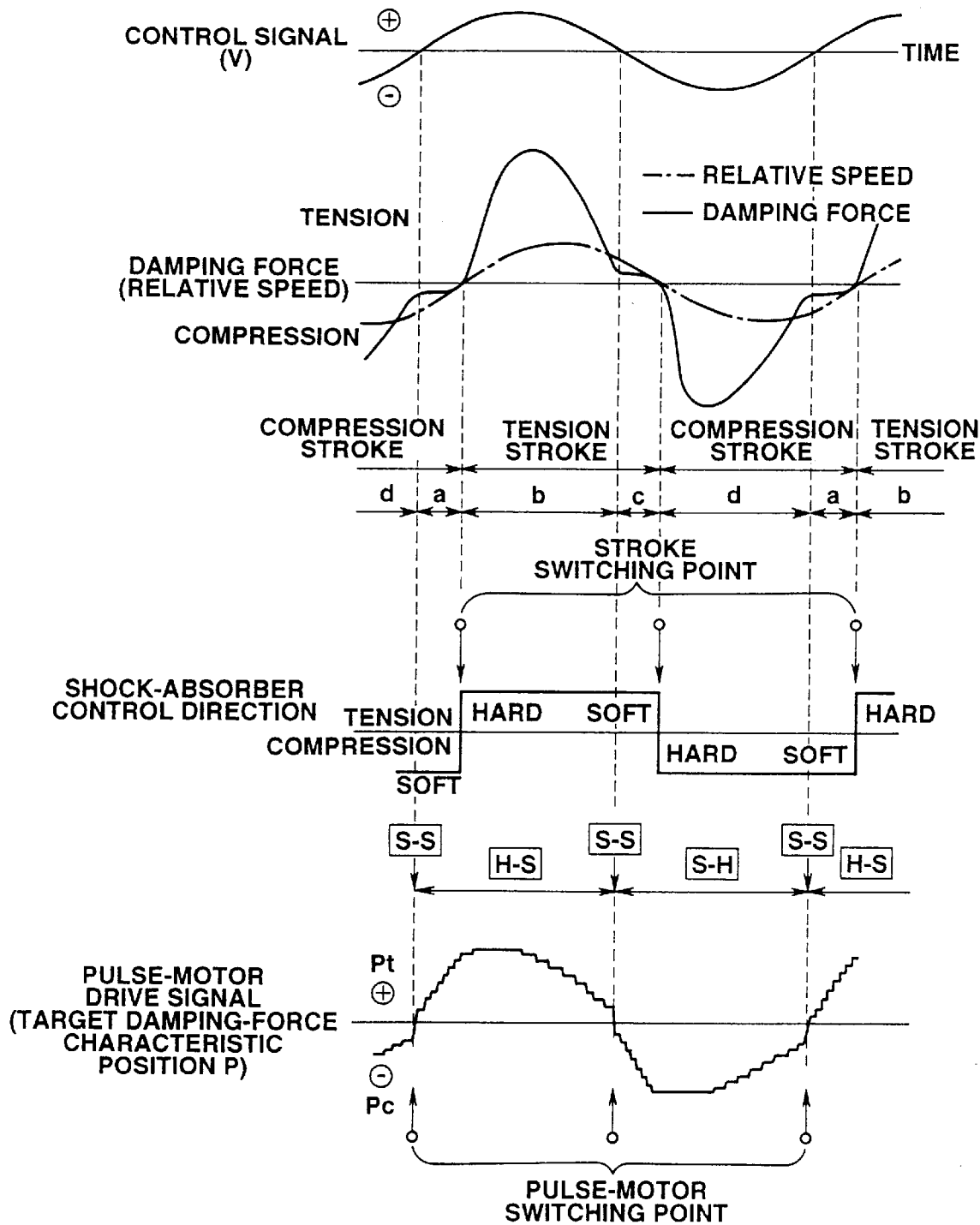
FIG. 15 is a time chart showing control of the damping-force characteristic during normal control.

Referring to FIGS. 14–15, normal control during non-braking of the vehicle will be described.

Referring to FIG. 14, at a step 101, it is determined whether or not the control signal has a positive value, i.e. whether or not the shock absorber SA is in the tension stroke. If answer is YES, control proceeds to a step 102 where the shock absorber SA is controlled in a tension-side hard region HS. If answer is NO, control proceeds to a step 103.

At the step 103, it is determined whether or not the control signal V has a negative value, i.e. whether or not the shock absorber SA is in the compression stroke. If answer is YES, control proceeds to a step 104 where the shock absorber SA is controlled in the compression-side hard region SH. If answer is NO, control proceeds to a step 105.

At the step 105 which is taken when answer at the steps 101, 103 is NO, i.e. a value of the control signal V is zero, the shock absorber SA is controlled in the soft region SS.

Referring to FIG. 15, when the control signal V is varied as shown in FIG. 15, and when its value is zero, the shock absorber SA is controlled in the soft region SS.

When a value of the control signal V is positive, the shock absorber SA is controlled in the tension-side hard region HS to fix the tension-side damping-force characteristic in the soft state. And the tension-side damping-force characteristic or the target damping-force characteristic position $P_T$ is changed in proportion to the control signal V and in accordance with a formula (11):

$$P_T = \beta_T \cdot V \qquad (11)$$

where $\beta_T$ is a tension-side constant.

When a value of the control signal V is negative, the shock absorber SA is controlled in the compression-side hard region SH to fix the tension-side damping-force characteristic in the soft state. And the compression-side damping-force characteristic or the target damping-force characteristic position $P_C$ is changed in proportion to the control signal V and in accordance with a formula (12):

$$P_C = \beta_C \cdot V \qquad (12)$$

where $\beta_C$ is a compression-side constant.

Referring to FIG. 15, a description will be made with regard to switching of the control region of the shock absorber SA, which is included in control of the damping-force characteristic in the control unit 4.

Referring to FIG. 15, in a region a, the control signal V resulting from the sprung vertical speed is switched from a negative value (downward direction) to a positive value (upward direction). In the region a, the relative speed has a negative value (the shock absorber SA is in the compression stroke), so that the shock absorber SA is controlled in the tension-side hard region HS in accordance with the direction of the control signal. Thus, in the region a, the compression stroke in which the shock absorber SA is at that time shows the soft characteristic.

In a region b, the control signal V has a positive value (upward direction), and the relative speed is switched from a negative value to a positive value (the shock absorber SA is in the tension stroke), so that the shock absorber SA is controlled in the tension-side hard region HS in accordance with the direction of the control signal V. And the shock absorber SA is in the tension stroke. Thus, in the region b, the tension stroke in which the shock absorber SA is at that time shows the hard characteristic proportional to a value of the control signal.

In a region C, the control signal V is switched from a positive value (upward direction) to a negative value (downward direction). However, the relative speed has a positive value (the shock absorber SA is in the tension stroke), so that the shock absorber SA is controlled in the compression-side hard region SH in accordance with the direction of the control signal V. Thus, in the region c, the tension stroke in which the shock absorber SA is at that time shows the soft characteristic.

In a region d, the control signal V has a negative value (downward direction), and the relative speed is switched from a positive value to a negative value (the shock absorber SA is in the tension stroke), so that the shock absorber SA is controlled in the compression-side hard region SH in accordance with the direction of the control signal V. And the shock absorber SA is in the compression stroke. Thus, in the region d, the compression stroke in which the shock absorber SA is at that time shows the hard characteristic proportional to a value of the control signal V.

As described above, in the first embodiment, when the control signal V resulting from the sprung vertical speed and the relative speed have the same sign, i.e. in the regions d, d, the stroke in which the shock absorber SA is at that time is controlled to show the hard characteristic. When they have different signs, i.e. in the regions a, c, the stroke in which the shock absorber SA is at that time is controlled to show the soft characteristic. That is, the same control as control of the damping-force characteristic based on the skyhook theory is carried out. Moreover, in the first embodiment, when switching the stroke of the shock absorber SA, i.e. when passing from the region a to the region b, and from the region c to the region d, i.e. from the soft characteristic to the hard characteristic, the damping-force characteristic position of the coming stroke is already switched to the hard characteristic in the previous region a, c, obtaining switching from the soft characteristic to the hard characteristic without time lag.

Figure 17:
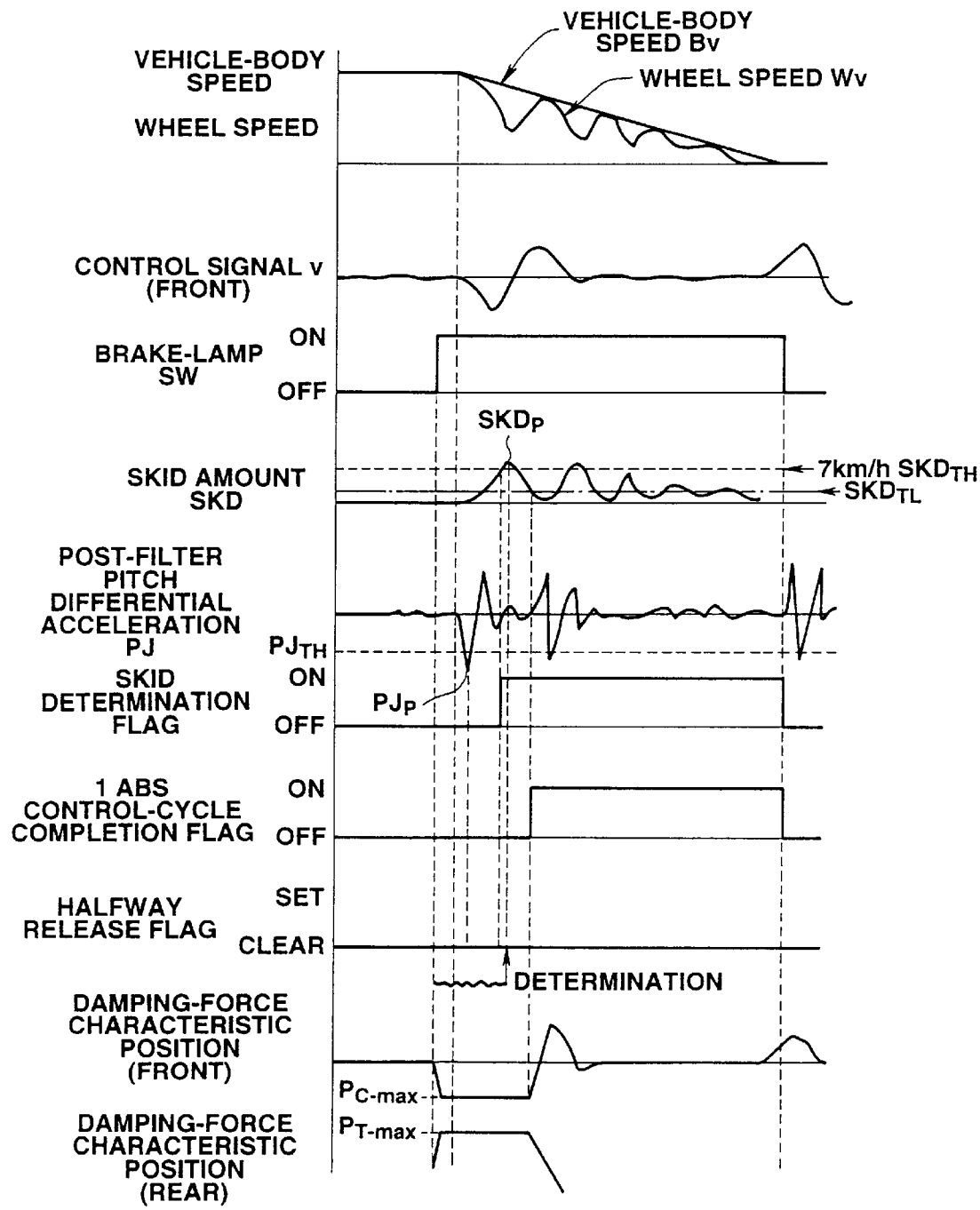
FIG. 17 is a view similar to FIG. 15, showing switching between normal control and braking control.

Referring to FIGS. 16–17, a description will be made with regard to switching between normal and braking controls of the damping-force characteristic of the shock absorber SA.

Referring to FIG. 16, at a step 201, it is determined whether or not the brake-lamp switch BS is turned on. If answer is NO, wherein it is not necessary to carry out braking control, control proceeds to a step 214 where all flags are cleared, and one flow is completed. If answer is YES, control proceeds to a step 202.

At the step 202, it is determined whether or not the braking-control completion flag is turned on. If answer is YES, control proceeds to a step 215 where a braking-control flag is turned off, and braking control is released. If answer is NO, control proceeds to a step 203.

At the step 203, it is determined whether or not a halfway release flag is turned on. If answer is YES, control proceeds to a step 215 where braking control is released. If answer is YES, control proceeds to a step 204 where control of the damping-force characteristic of the shock absorber SA is switched from normal control to braking control, and the braking-control flag is turned on. Then, control proceeds to a step 205.

At the step 205, in order to determine the brake operating state, it is determined whether or not the peak value PJp of the pitch differential acceleration PJ is equal to or greater than the predetermined threshold value $PJ_{TH}$. If answer is NO, wherein quick braking is not produced which requires antiskid control, control proceeds to a step 220 where the halfway release flag is turned on, and one flow is completed. If answer is YES, control proceeds to a step 206.

At the step 206, in order to determine the road $\mu$, it is determined whether or not the peak value SKDp of the skid amount SKD is equal to or greater than 7.0 km/h. If answer is YES, wherein the possibility of braking control is very small, control proceeds to the step 220 where the halfway release flag is turned on. If answer is NO, control proceeds to a step 207.

At the step 207, it is determined whether or not the skid amount SKD is equal to or greater than the predetermined skidding-state determination threshold value $SKD_{TH}$. If answer is NO, control proceeds to a step 216 where it is determined whether or not the skid determination flag is turned on. If answer is YES at the step 216, control proceeds to a step 217 where the skid determination flag is cleared, then it proceeds to a step 211. On the other hand, if answer is YES at the step 207, control proceeds to a step 208 where the skid determination flag is turned on, then it proceeds to a step 209.

At the step 209, it is determined whether or not the skid amount SKD is equal to or smaller than the predetermined neutral-zone threshold value $SKD_{TT}$. If answer is NO, control proceeds to a step 218 where it is determined whether or not the one antiskid control cycle completion flag is tuned on. If answer is YES, control proceeds to a step 219 where the one antiskid control cycle completion flag is cleared, then it proceeds to the step 211. If answer is NO, control proceeds to a step 210 where the one antiskid control cycle completion flag is turned on, then it proceeds to the step 211.

At the step 211, it is determined whether or not the skid determination flag is switched to the on state. If answer is NO, control proceeds to a step 221 where the braking-control completion flag is turned off to continuously carry out braking control, and one flow is completed. If answer is YES, control proceeds to a step 212.

At the step 212, it is determined whether or not the one antiskid control cycle completion flag is switched to the on state. If answer is NO, control proceeds to the step 221 to continuously carry out braking control. If answer is YES, control proceeds to a step 213 where the braking-control completion flag is turned on to stop braking control, and one flow is completed.

The above flow is repeatedly carried out thereafter.

Figure 18:
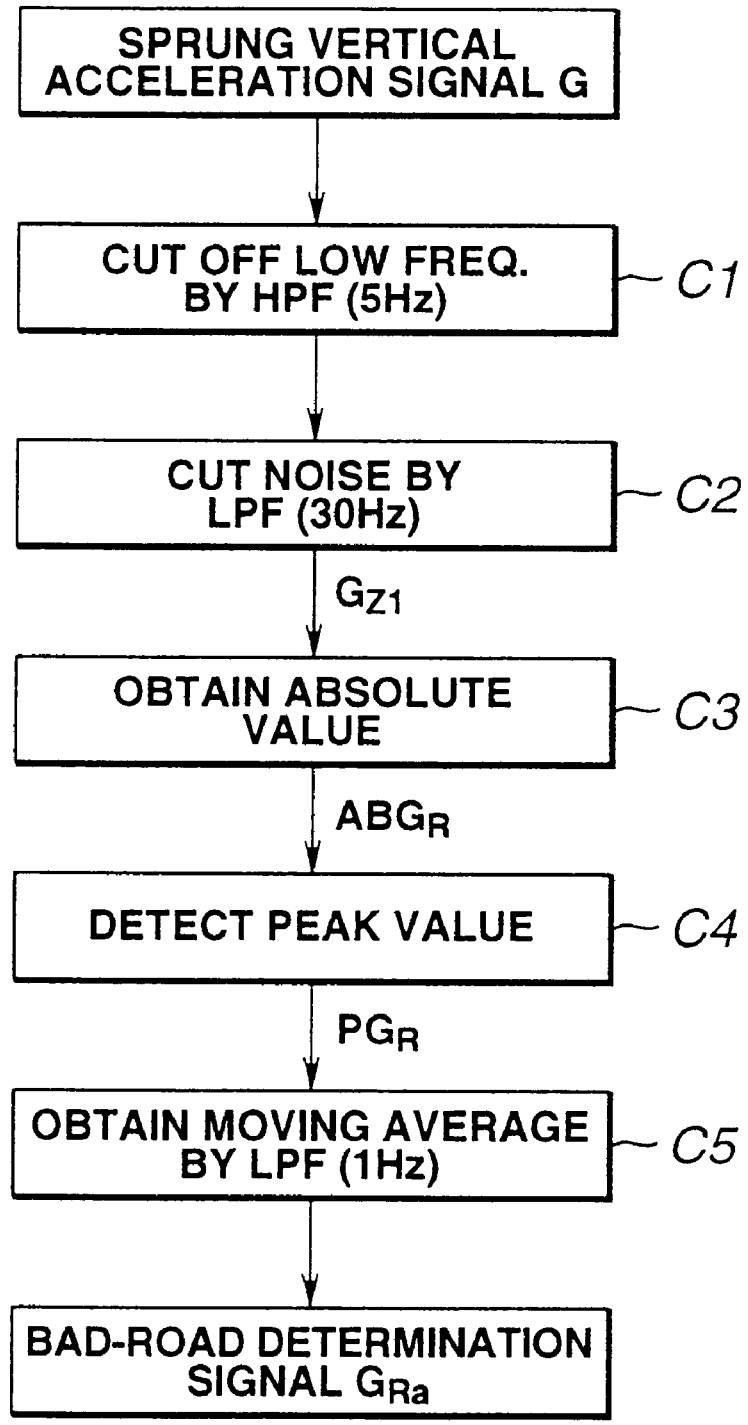
FIG. 18 is a view similar to FIG. 13, showing a signal processing circuit for obtaining a bad-road determination signal.

Referring to FIG. 18, a signal processing circuit for obtaining a bad-road determination signal $G_{Ra}$ will be described. At a block C1, a sprung vertical acceleration signal G undergoes a low-frequency cutoff processing through a high-pass filter HPF (5 Hz), and at a block C2, it undergoes a noise cutoff processing through a low-pass filter LPF (30 Hz), obtaining a high-frequency component signal $G_{L1}$. At a block C3, an absolute value of the high-frequency component signal $G_{L1}$ is obtained to form an absolute-value signal $ABG_R$. At a block C4, a peak value $PG_R$ of the absolute-value signal $ABG_R$ is detected. At a block C5, the peak value $PG_R$ undergoes a moving-average processing through a low-pass filter LPF (1 Hz) to obtain the bad-road determination signal $G_{Ra}$.

Figure 19:
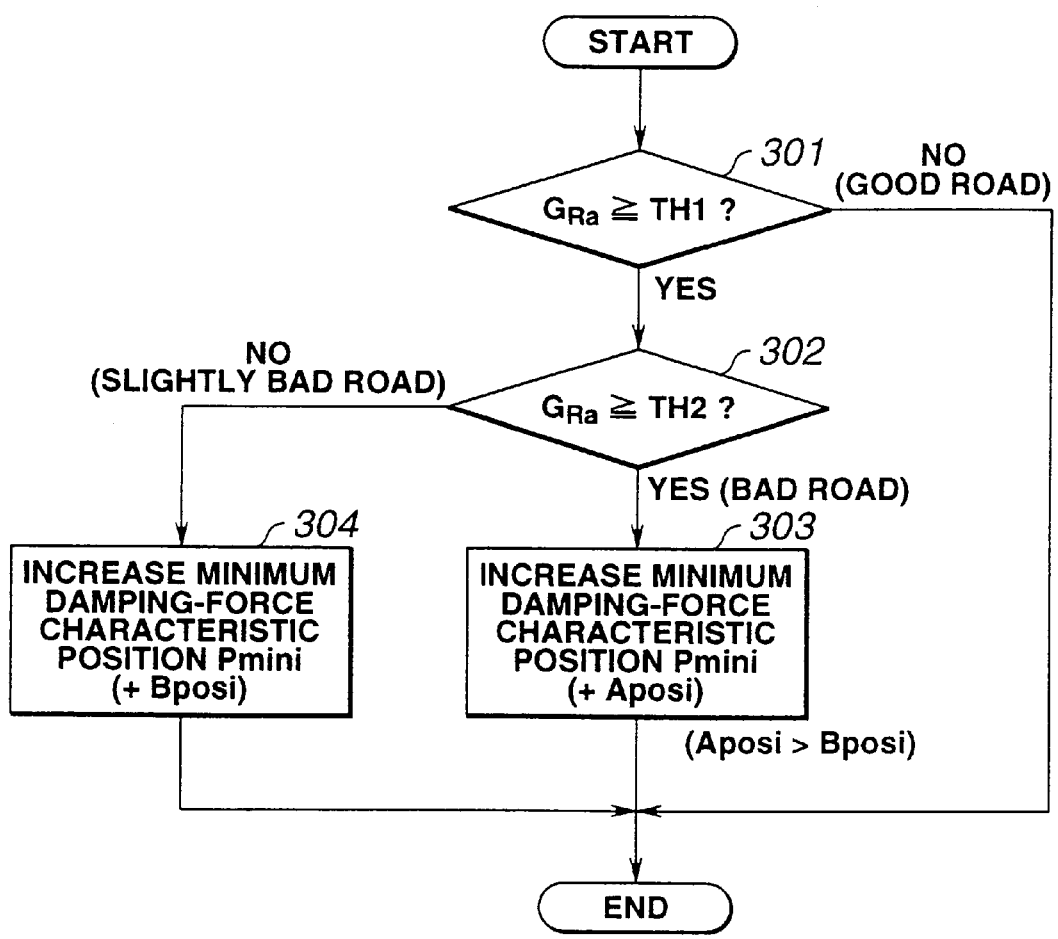
FIG. 19 is a view similar to FIG. 16, showing switching between control of the damping-force characteristic during cruising on a good road and that one during cruising on a bad road.

Referring to FIG. 19, a description will be made with regard to bad-road determination based on the bad-road determination signal $G_{Ra}$ or road input frequency determination, and switching of the damping-force characteristic based thereon.

At a step 301, it is determined whether or not the bad-road determination signal $G_{Ra}$ is equal to or greater than a predetermined first good-road determination threshold value TH1 to determine whether or not the road surface is bad. If answer is YES, i.e. the road surface is bad, control proceeds to a step 302 to determine the degree of the bad road.

At the step 302, it is determined whether or not the bad-road determination signal $G_{Ra}$ is equal to or greater than a predetermined second good-road determination threshold value TH2. If answer is YES, i.e. the road surface is bad, control proceeds to a step 303 where a minimum damping-force characteristic position Pmini of the shock absorber SA is set to a value obtained by adding a predetermined offset position Aposi to a value during normal control, and one flow is completed. If answer is No, i.e. the road surface is slightly bad, control proceeds to a step 304 where the minimum damping-force characteristic position Pmini is set to a value obtained by adding a predetermined offset position Bposi to a value during normal control, and one flow is completed. Note that the relationship between the offset position Aposi and Bposi is given by Aposi>Bposi in proportion to the degree of the bad road.

At the step 301, if answer is No, i.e. the road surface is good, the minimum damping-force characteristic position Pmini of the shock absorber SA is maintained at or returned to a value during normal control, and one flow is completed.

Figure 25:
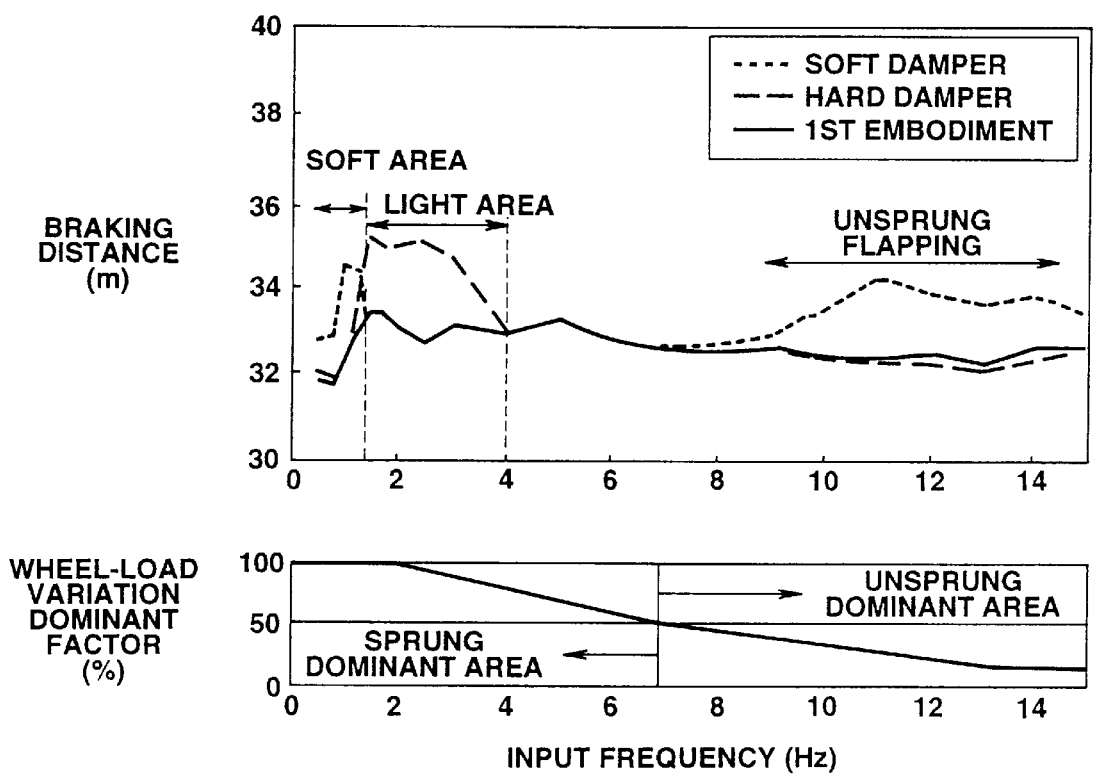
FIG. 25 is a diagrammatic view showing the relationship between the input frequency and the braking distance due to a difference in a damping force.

Referring to FIGS. 17 and 25, a description will be made with regard to switching between normal and braking controls of the damping-force characteristic of the shock absorber SA.

A) During Cruising on a Good Road with no Braking

When the road surface is good, and the vehicle is in normal cruising with no brake operation, a signal out of the brake-lamp switch BS is in the off state. At that time, normal control is maintained to carry out control of the damping-force characteristic based on the skyhook theory.

Therefore, as described above, control is carried out to minimize variations in kinetic and potential energies of the sprung mass, resulting in an improvement in the braking performance when a wheel load varies with variations in the sprung mass, i.e. during cruising on a good road.

B) During Cruising on a Bad Road with no Braking

When the road surface is bad, and the vehicle is in normal cruising with no brake operation, the minimum damping-force characteristic position Pmini of the shock absorber SA is set to a value obtained by adding the predetermined offset position Aposi to a value during normal control in accordance with the degree of a bad road.

Therefore, referring to FIG. 25, when a wheel load varies with, principally, variations in the unsprung mass, i.e. during cruising on a bad road, the damping-force characteristic of the shock absorber SA is corrected to the hard side to restrain unspring flapping during cruising on a bad road, obtaining restrained wheel-load variations, resulting in an improvement in the braking performance.

C) During Braking

When having braking, control is carried out, in accordance with a on signal out of the brake-lamp switch BS, to switch the damping-force characteristic of the shock absorber SA on the actual stroke side to a maximum damping-force characteristic position Pmax. Specifically, with regard to the front-wheel side shock absorbers $SA_{FR}$, $SA_{FL}$, in accordance with depression of the vehicle body on the front-wheel side, the compression-stroke side damping-force characteristic is switched to a compression-side maximum damping-force characteristic position. $P_C$-max. Moreover, with regard to the rear-wheel side shock absorbers $SA_{RR}$, $SA_{RL}$, in accordance with rising of the vehicle body on the rear-wheel side, the tension-stroke side damping-force characteristic is switched to a tension-side maximum damping-force characteristic position $P_T$-max. Then, such positions are fixed until determination of predetermined release conditions is made (0.2 sec).

That is, in accordance with a on signal out of the brake-lamp switch BS which can detect a driver's intention of brake operation the most quickly, braking control is started unconditionally to restrain a behavior of the vehicle due to quick braking from the initial stage to obtain maximally restrained wheel-load variations, increasing the braking performance, resulting in possible reduction in the braking distance.

The above braking control is completed as soon as one cycle of antiskid control is completed, and it is switched to normal control.

When the following halfway release conditions are established, braking control is immediately released halfway or without completing one cycle of antiskid control, and it is switched to normal control.

a) Upon turn-off of the brake-lamp switch

When a signal out of the brake-lamp switch BS is turned off, braking control is released halfway.

b) During slow braking

When braking is too slow to require antiskid control due to small or light depression of the brake pedal, a particular increase in the braking performance is not needed, and braking control can deteriorate riding comfort of the vehicle. Thus, braking control is released halfway to secure riding comfort of the vehicle.

c) During cruising on a low-$\mu$ road

When the road surface has a low $\mu$, the possibility of braking control is very small as described above even if quick braking is produced which requires antiskid control. Thus, braking control is released halfway to give importance to riding comfort of the vehicle.

As described above, the first embodiment produces the following effects:

First, in any case, control of the damping-force characteristic of the shock absorber SA is always carried out to decrease wheel-load vibrations, enabling optimum control of the braking performance in all conditions.

Second, braking control is unconditionally started by a on signal out of the brake-lamp switch BS, and it is released halfway when becoming unnecessary. Therefore, during quick braking, it is possible to effectively restrain a behavior of the vehicle in the initial stage, and thus to surely reduce the braking distance. Moreover, when braking control is not necessary, it is immediately released halfway to secure riding comfort of the vehicle.

Third, in the damping area where the direction discrimination signs of the sprung vertical speed and the sprung-unsprung relative speed coincide with each other, the damping-force characteristic of the shock absorber SA on the actual stroke side is controlled to be high to increase a damping force of the vehicle. On the other hand, in the agitating area where the direction discrimination sighs do not coincide with each other, the damping-force characteristic of the shock absorber SA on the actual stroke side is controlled to be low to decrease an agitating force of the vehicle. That is, switching of the damping-force characteristic is carried out based on the skyhook theory. Therefore, when a wheel load varies with variations in the sprung mass, i.e. during cruising on a good road, the damping-force characteristic of the shock absorber SA can always be controlled to decrease wheel-load variations or increase the braking performance without determining the road input frequency.

Figure 20:
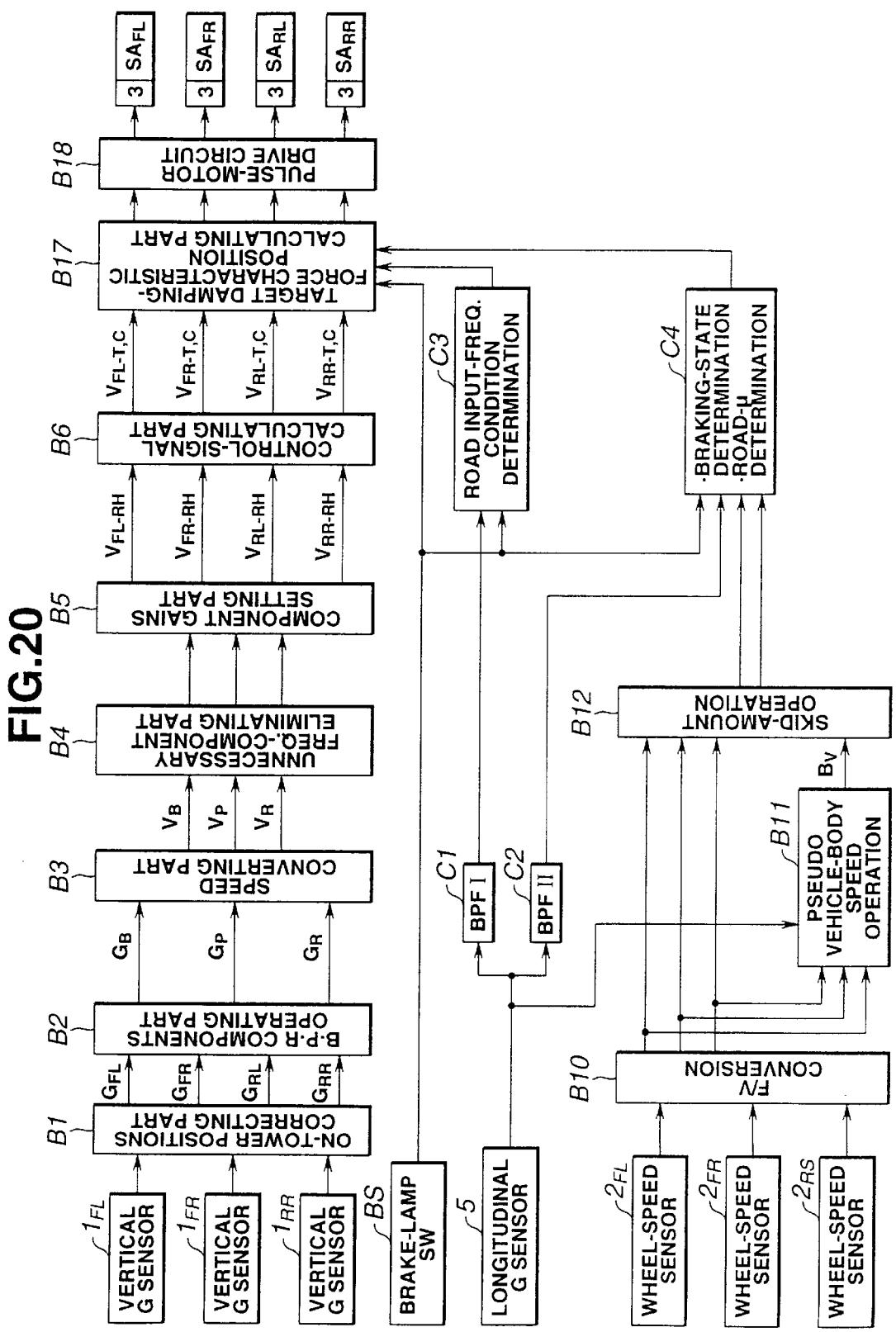
FIG. 20 is a view similar to FIG. 18, showing a second embodiment of the present invention.

FIGS. 20–23 show a second embodiment of the present invention which is substantially the same as the first embodiment except the content of the damping-force characteristic controlling means (see FIG. 13) in the control unit 4 as shown in FIG. 20.

Referring to FIG. 20, at a block C1, a longitudinal acceleration signal sensed by a longitudinal G sensor 5 is processed by a band-pass filter BPFI (6–8 Hz) to obtain a high-frequency component signal of the longitudinal acceleration signal. At a block C2, the longitudinal acceleration signal is processed by a band-pass filter BPFII (0.5–1.5 Hz) to obtain a low-frequency component signal of the longitudinal acceleration signal. At a block C3 subsequent to the block C1, the condition of the road input frequency is determined in accordance with a signal out of the brake-lamp switch BS and the high-frequency component signal of the longitudinal acceleration signal.

Figure 21:
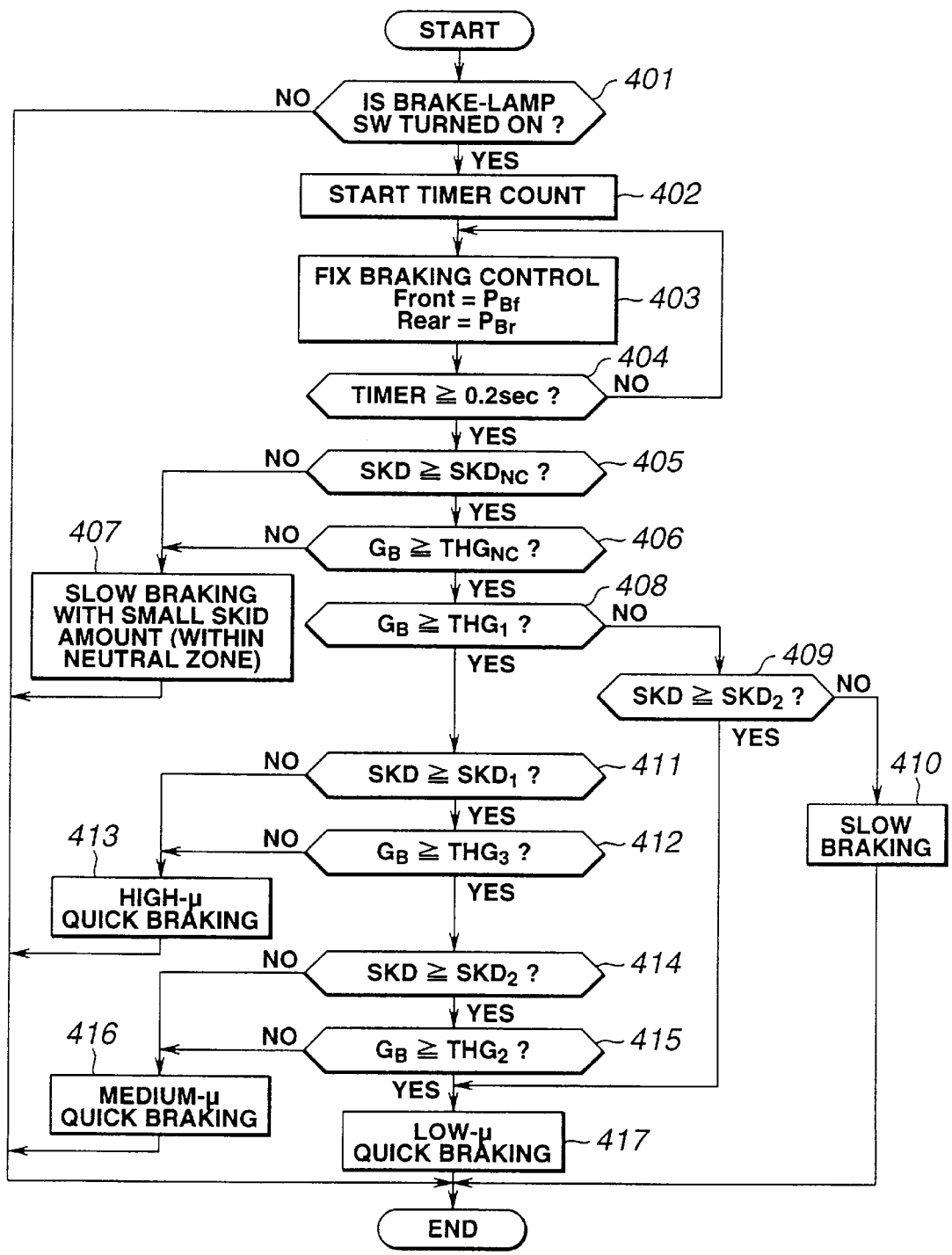
FIG. 21 is a view similar to FIG. 19, showing switching between normal control and braking control.
Figure 24:
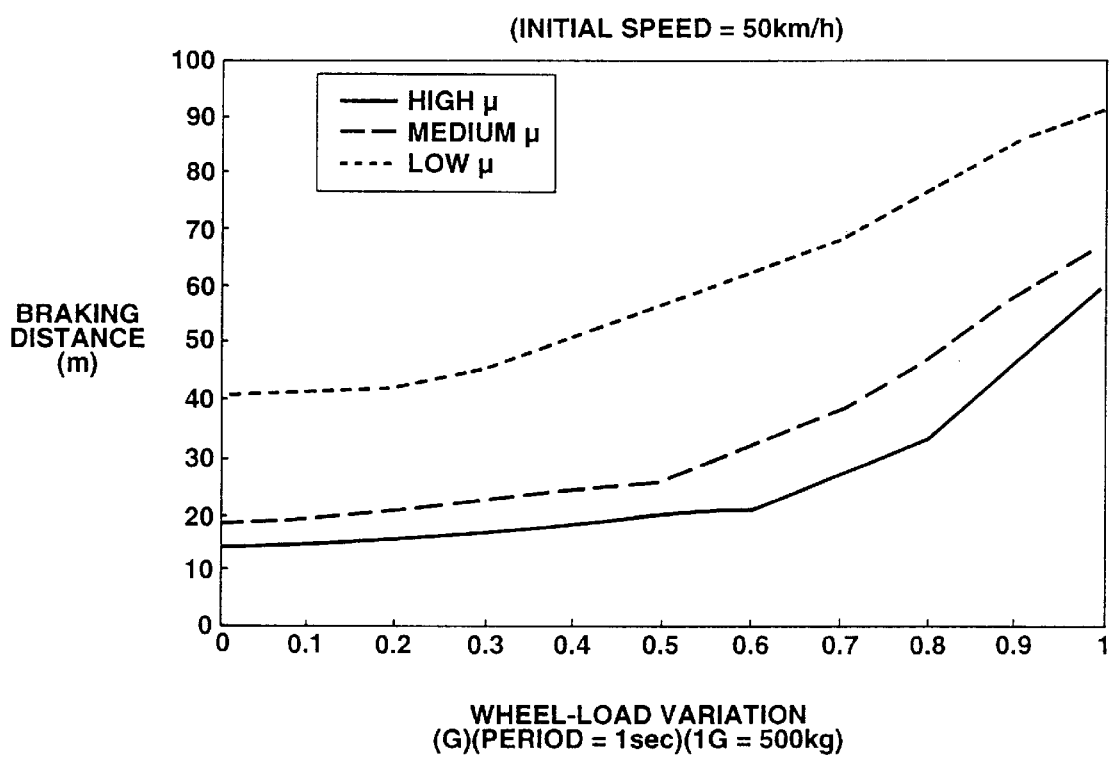
FIG. 24 is a view similar to FIG. 5, showing the relationship between wheel-load variations and the braking distance.

At a block C4 subsequent to the blocks B12 and C2, the road $\mu$ and the brake operating state are determined in accordance with the high-frequency component signal of the longitudinal acceleration signal, the skid amount SKD, a flowchart as shown in FIG. 21, and a map as shown in FIG. 22, which will be described in detail later.

At a block B17 (target) damping-force characteristic position calculating part) subsequent to the blocks B6, C3, and C4, a target damping-force characteristic position P ($P_T$, $P_C$) or control damping coefficient C of the shock absorber SA during normal control is calculated from the control signal V ($V_{FR-T}$, $V_{FL-T}$, $V_{RR-T}$, $V_{RL-T}$ and $V_{FR-C}$, $V_{FL-C}$, $V_{RR-C}$, $V_{RL-C}$) in accordance with the flowchart as shown in FIG. 14 in the same way as in the first embodiment. Moreover, braking control during braking of the vehicle is carried out in accordance with the flowchart as shown in FIG. 16.

Finally, at a block B18 (pulse-motor drive circuit), a drive signal is provided to the pulse motor 3 to drive the shock absorber SA to the target damping-force characteristic position P ($P_T$, $P_C$).

Referring to FIGS. 21 and 22, a description will be made with regard to determination of the road $\mu$ and the brake operating state at the block C4 as shown in FIG. 20.

Referring to FIG. 21, at a step 401, it is determined whether or not the brake-lamp switch BS is turned on. If answer is NO, wherein braking control is not needed, one flow is completed. If answer is YES, control proceeds to a step 402 where a timer count is started. At a step 403, switching of control of the damping-force characteristic of the shock absorber SA is carried out from normal control to braking control. Specifically, switching the damping-force characteristic of the shock absorber SA on the actual stroke side to a maximum damping-force characteristic position Pmax. Specifically, with regard to the front-wheel side shock absorbers $SA_{FR}$, $SA_{FL}$, the damping-force characteristic position on the actual stroke side is fixed to a hard position $P_{bT}$ or compression-side maximum damping-force characteristic position $P_C$-max in the region SH. Moreover, with regard to the rear-wheel side shock absorbers $SA_{RR}$, $SA_{RL}$, the damping-force characteristic position on the actual stroke side is fixed to a hard position $P_{Br}$ or tension-side maximum damping-force characteristic position $P_T$-max in the region HS.

At a step 404 subsequent to the step 403, it is determined whether or not a timer count is equal to or greater than 0.2 sec. If answer is YES, control proceeds to a step 405, whereas if answer is NO, control returns to the step 403. Note that 0.2 sec is a time elapsing from a point of turn-on of the brake-lamp switch BS to a point immediately before a first return of the wheel speed due to ABS operation. A maximum of the skid amount SKD can be detected at a point immediately before a first return of the wheel speed. At a point before that point, the skid amount SKD is difficult to be detected due to its small variations, whereas at a point after that point, the skid amount SKD cannot be detected accurately due to a return of the wheel speed.

At the step 405, it is determined whether or not the skin amount SKD is equal to or greater than a predetermined neutral-zone threshold value $SKD_{NC}$. If answer is YES, control proceeds to a step 406. If answer is NO, control proceeds to a step 407 where it is determined that the skid amount SKD is within the neutral zone, i.e. it is small, and one flow is completed.

At the step 406, it is determined whether or not the low-frequency component signal $G_B$ of the longitudinal acceleration signal is equal to or greater than a predetermined first threshold value $THG_1$. If answer is NO, wherein brake operation is low, or brake operation is quick with the road surface having a low $\mu$ as shown in FIG. 22, control proceeds to a step 409 to determined the road-surface frictional coefficient. Specifically, at the step 409, it is determined whether or not the skid amount SKD is equal to or greater than a predetermined second skid threshold value $SKD_2$. If answer is YES, control proceeds to a step 417 where it is determined that brake operation is quick with the road surface having a low $\mu$, and one flow is completed. If answer is NO, control proceeds to a step 410 where it is determined that brake operation is low, and one flow is completed.

At the step 408, if answer is YES, wherein brake operation is quick with the road surface having a low $\mu$, or brake operation is quick with the road surface having a medium $\mu$, or brake operation is quick with the road surface having a high $\mu$ as shown in FIG. 22, control proceeds to a step 411. At the step 411, it is determined whether or not the skid amount SKD is equal to or greater than a predetermined first skid threshold value $SKD_1$. If answer is NO, control proceeds to a step 413 where it is determined that brake operation is quick with the road surface having a high $\mu$, and one flow is completed. If answer is YES, control proceeds to a step 412 where it is determined whether or not the low-frequency component signal $G_B$ of the longitudinal acceleration signal is equal to or greater than a predetermined third threshold value $THG_3$. If answer is NO, control proceeds to the step 413 where it is determined that brake operation is quick with the road surface having a high $\mu$, and one flow is completed. If answer is YES, control proceeds to a step 414.

At the step 414, it is determined whether or not the skid amount SKD is equal to or greater than a predetermined second threshold value $SKD_2$. If answer is NO, control proceeds to a step 416 where it is determined that brake operation is quick with the road surface having a medium $\mu$, and one flow is completed. If answer is YES, control proceeds to a step 415 where the low-frequency component signal $G_B$ of the longitudinal acceleration signal is equal to or greater than a predetermined second threshold value $THG_2$. If answer is NO, control proceeds to the step 416 where brake operation is quick with the road surface having a medium $\mu$, and one flow is completed. If answer is YES, control proceeds to a step 417 where it is determined that brake operation is quick with the road surface having a low $\mu$, and one flow is completed.

The above flow is repeatedly carried out thereafter.

Referring to FIG. 23, a description will be made with regard to switching between normal and braking controls of the damping-force characteristic of the shock absorber SA in accordance with the brake operating state obtained from FIG. 22, the result of road input frequency determination (result of bad-road determination obtained based on FIG. 18 in the first embodiment).

A) During Cruising on a Good Road with no Braking

When the road surface is good, and the vehicle is in normal cruising with no brake operation, a signal out of the brake-lamp switch BS is in the off state. At that time, normal control is maintained to carry out control of the damping-force characteristic based on the skyhook theory.

Therefore, as described above, control i s carried out to minimize variations in kinetic and potential energies of the sprung mass, resulting in an improvement in the braking performance when a wheel load varies with variations in the sprung mass, i.e. during cruising on a good road.

B) During Cruising on a Bad Road with no Braking

When the road surface is bad, and the vehicle is in normal cruising with no brake operation, the minimum damping-force characteristic position Pmini of the shock absorber SA is set to a value obtained by adding the predetermined offset position Aposi to a value during normal control in accordance with the degree of a bad road.

Therefore, when a wheel load varies with, principally, variations in the unsprung mass, i.e. during cruising on the bad road, the damping-force characteristic of the shock absorber SA is corrected to the hard side to restrain unsprung flapping during cruising on a bad road, obtaining restrained wheel-load variations, resulting in an improvement in the braking performance.

C) During Braking

When having braking, control is carried out, in accordance with a on signal out of the brake-lamp switch BS, to switch the damping-force characteristic of the shock absorber SA on the actual stroke side to a maximum damping-force characteristic position Pmax. Specifically, with regard to the front-wheel side shock absorbers $SA_{FR}$, $SA_{FL}$, in accordance with depression of the vehicle body on the front-wheel side, the compression-stroke side damping-force characteristic is switched to a compression-side maximum damping-force characteristic position $P_C$-max. Moreover, with regard to the rear-wheel side shock absorbers $SA_{RR}$, $SA_{RL}$, in accordance with rising of the vehicle body on the rear-wheel side, the tension-stroke side damping-force characteristic is switched to a tension-side maximum damping-force characteristic position $P_T$-max. Then, such positions are fixed until determination of predetermined release conditions is made (0.2 sec).

That is, in accordance with a on signal out of the brake-lamp switch BS which can detect a driver's intention of brake operation the most quickly, braking control is started unconditionally to restrain a behavior of the vehicle due to quick braking from the initial stage to obtain maximally restrained wheel-load variations, increasing the braking performance, resulting in possible reduction in the braking distance.

The above braking control is completed as soon as one cycle of antiskid control is completed, and it is switched to normal control.

When the following halfway release conditions are established, braking control is immediately released halfway or without completing one cycle of antiskid control, and it is switched to normal control.

a) Upon turn-off of the brake-lamp switch

When a signal out of the brake-lamp switch BS is turned off, braking control is released halfway.

b) During slow braking

When braking is too slow to require antiskid control due to small or light depression of the brake pedal, a particular increase in the braking performance is not needed, and braking control can deteriorate riding comfort of the vehicle. Thus, braking control is released halfway to secure riding comfort of the vehicle.

c) During cruising on a low-$\mu$ road

When the road surface has a low $\mu$, the possibility of braking control is very small as described above even if quick braking is produced which requires antiskid control. Thus, braking control is released halfway to give importance to riding comfort of the vehicle.

d) During cruising on a medium-$\mu$ road

When the road surface has a medium $\mu$, the possibility of braking control is small as described above even if quick braking is produced which requires antiskid control. Thus, braking control is released halfway to give importance to riding comfort of the vehicle, and a control gain of the damping-force characteristic in normal control is increased slightly to obtain slightly increased braking effect.

e) During cruising on a high-$\mu$ road

When the road surface has a high $\mu$, the possibility of braking control is very large if quick braking is produced which requires antiskid control.

Thus, braking control is continuously carried out to give importance to riding comfort of the vehicle, and a control gain of the damping-force characteristic in normal control is increased further than during cruising on a medium-$\mu$ road, obtaining maximally increased braking effect.

As described above, the second embodiment produces not only substantially the same effect as that of the first embodiment, but an effect of achieving the compatibility of braking performance and riding comfort more finely by three steps of road-$\mu$ determination and a control gain of the damping-force characteristic in normal control variably controlled in accordance therewith.

Figure 26:
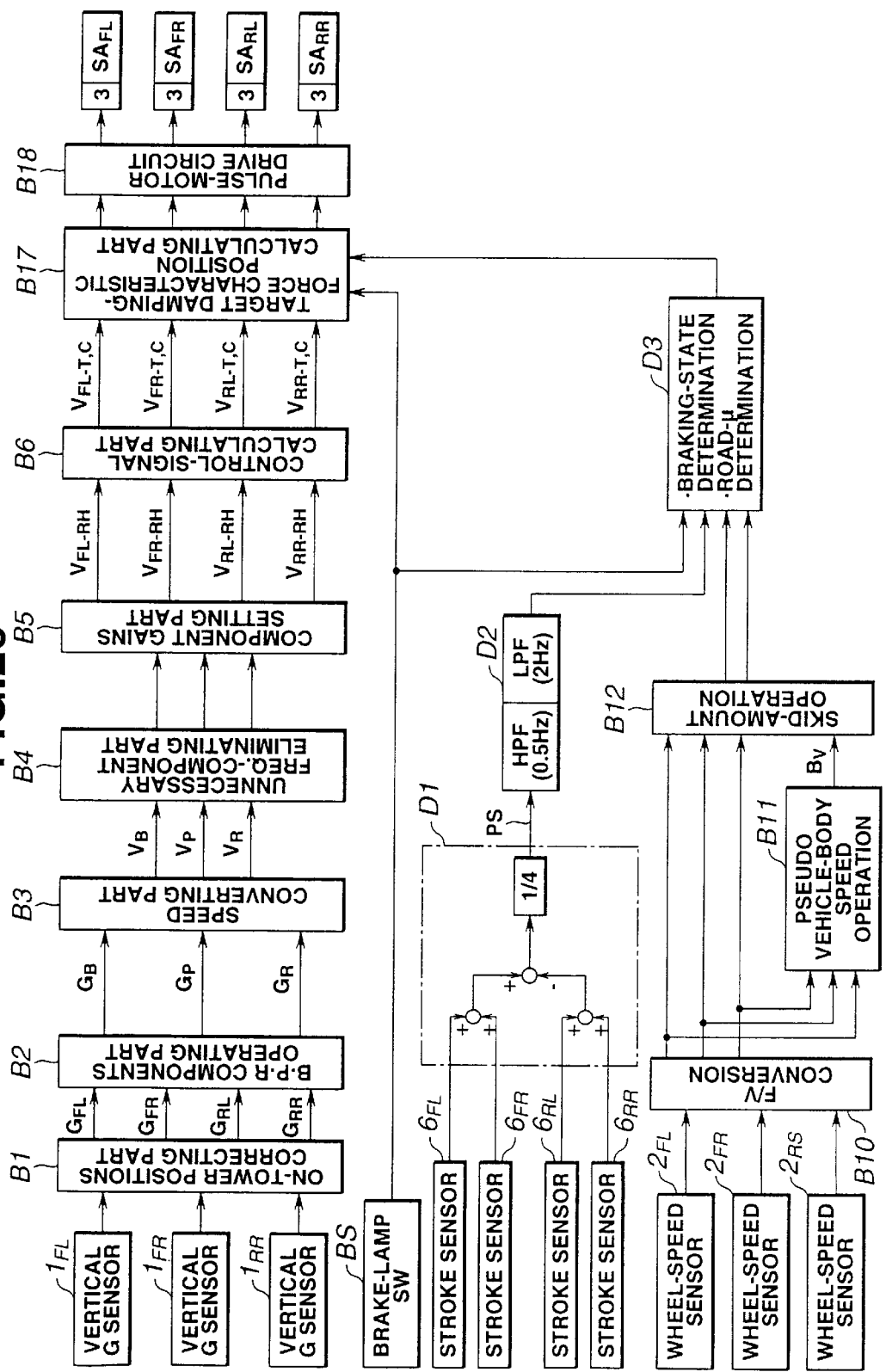
FIG. 26 is a view similar to FIG. 20, showing a third embodiment of the present invention.
Figure 27:
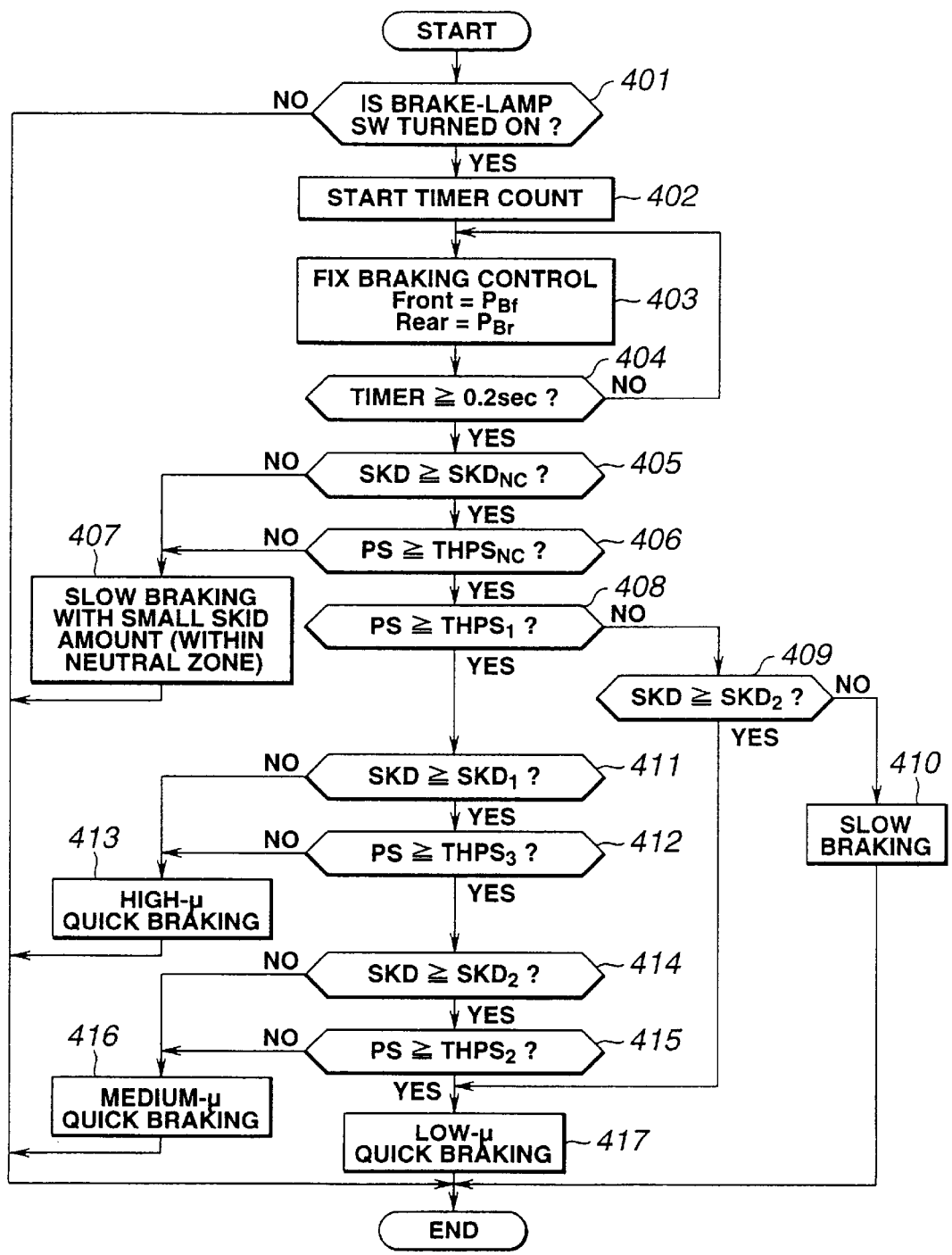
FIG. 27 is a view similar to FIG. 21, showing switching between normal control and braking control.
Figure 28:
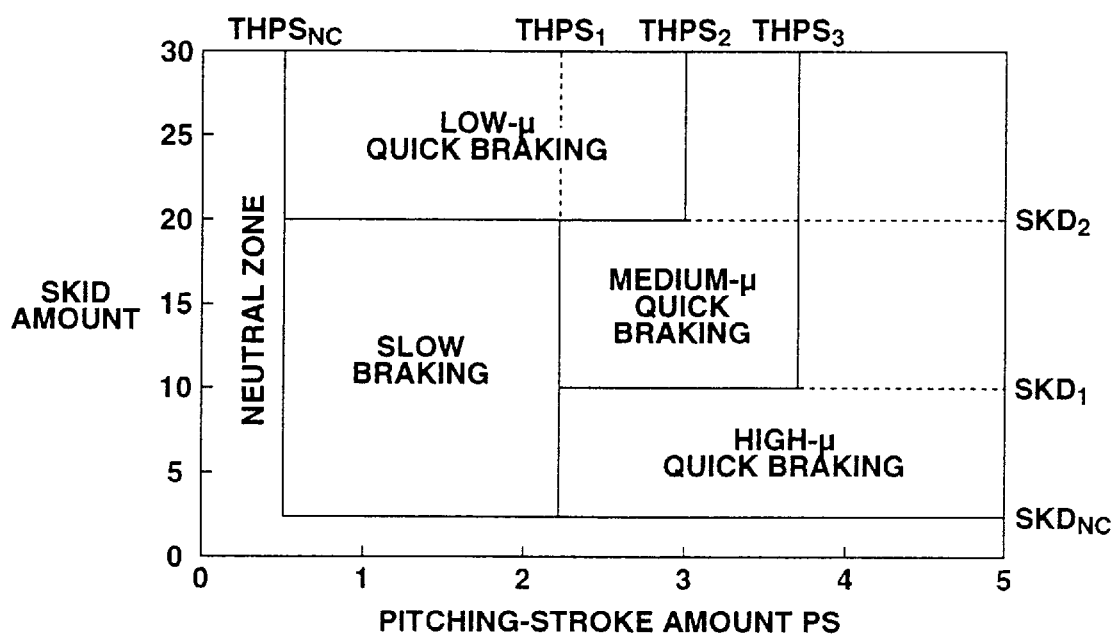
FIG. 28 is a view similar to FIG. 23, illustrating determination of the road-surface frictional coefficient and the brake operating state.

FIGS. 26–28 show a third embodiment of the present invention which is substantially the same as the second embodiment except the content of the damping-force characteristic controlling means (see blocks C1–C3 in FIG. 13) in the control unit 4 as shown in FIG. 26. That is, the third embodiment differs from the second embodiment in brake operating state sensing means. In the third embodiment, a stroke sensor 6 ($6_{FR}$, $6_{FL}$, $6_{RR}$, $6_{RL}$) is used in place of the longitudinal G sensor 5.

Referring to FIG. 26, at a block D1, a vehicular pitching stroke amount PS is calculated in accordance with a difference between front- and rear-wheels stroke signals sensed by the stroke sensor 6. At a block D2, a processing is carried out to eliminate unnecessary frequency components by a high-pass filter HPF (0.5 Hz) and a low-pass filter LPF (2.0 Hz).

At a block D3 subsequent to the blocks B12 and D2, the road-$\mu$ and the brake operating state are determined based on a signal out of the brake-lamp switch BS, a signal of the vehicular pitching stroke amount PS, a skid amount SKD obtained at the block B12 and in accordance with a flowchart as shown in FIG. 27 and a map as shown in FIG. 28.

The flowchart of FIG. 27 and the map of FIG. 28 show the content of determination of the road-$\mu$ and the brake operating state at the block D3 in FIG. 26, which are substantially the same as the flowchart of FIG. 21 and the map of FIG. 22 as described above except that at steps 406, 408, 412, and 415, a signal for determining the brake operating state is obtained from the vehicular pitching stroke amount PS in place of the low-frequency component $G_B$ of the longitudinal acceleration signal.

Specifically, at the step 406, it is determined whether or not the vehicular pitching stroke amount PS is equal to or greater than a predetermined neutral-zone threshold value $THPS_{NZ}$. At the step 408, it is determined whether or not the vehicular pitching stroke amount PS is equal to or greater than a predetermined first threshold value $THP_1$. At the step 412, it is determined whether or not the vehicular pitching stroke amount PS is equal to or greater than a predetermined third threshold value $THP_3$. At the step 415, it is determined whether or not the vehicular pitching stroke amount PS is equal to or greater than a predetermined second threshold value $THP_2$.

In the third embodiment, the method of determining a bad road or the condition of the road input frequency is the same as in the first embodiment.

Figure 29:
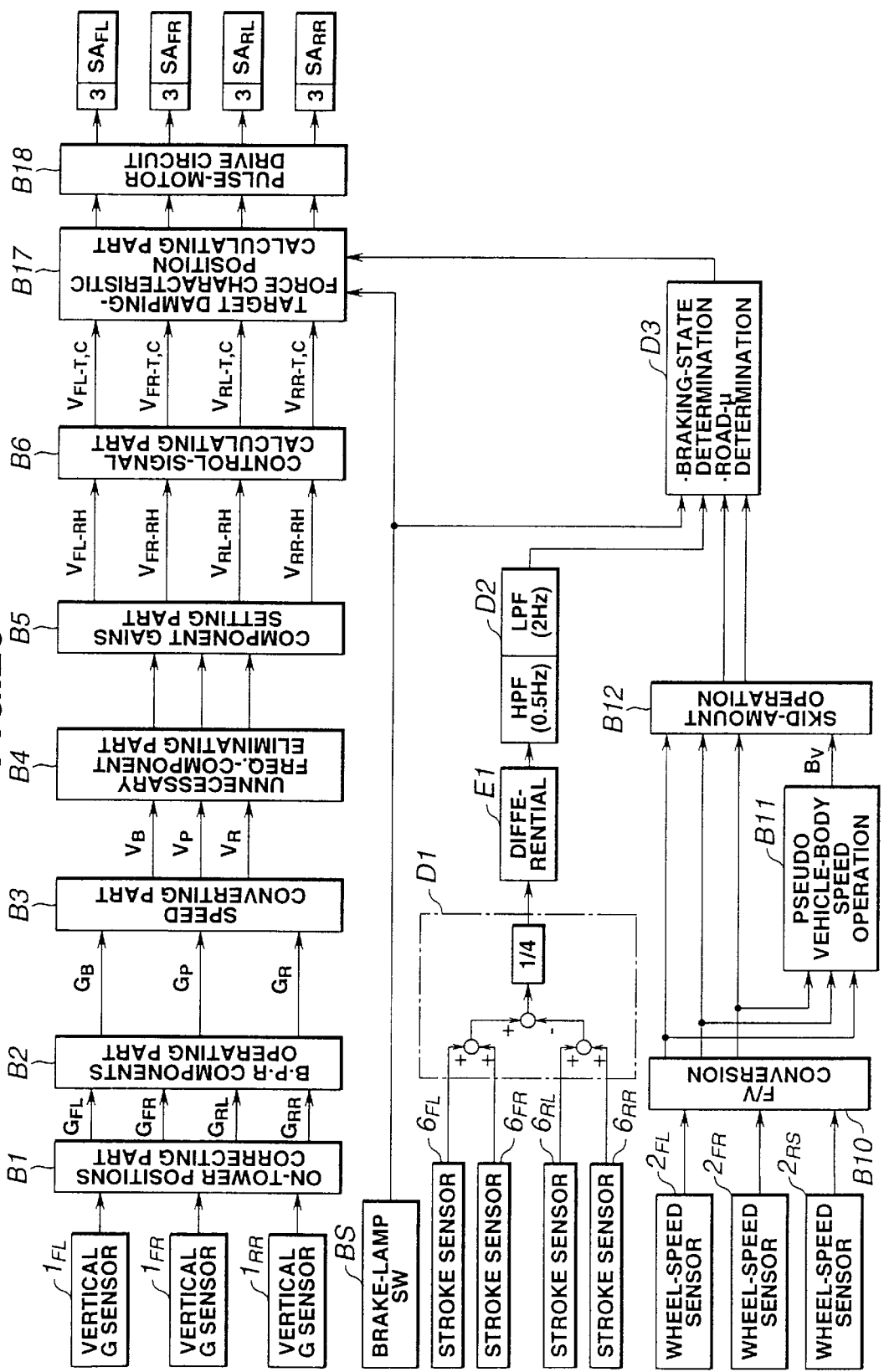
FIG. 29 is a view similar to FIG. 26, showing a fourth embodiment of the present invention.
Figure 30:
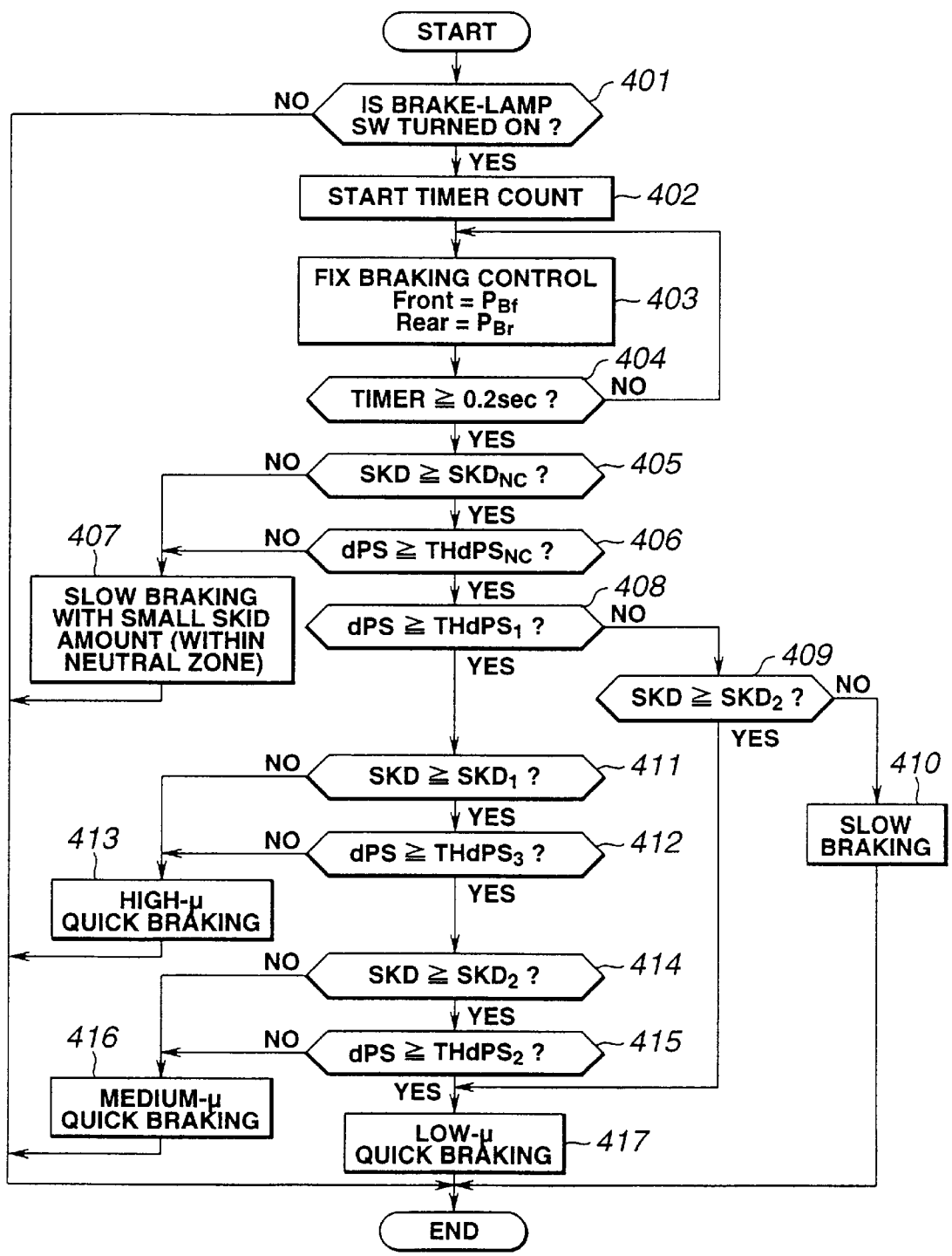
FIG. 30 is a view similar to FIG. 27, showing switching between normal control and braking control.
Figure 31:
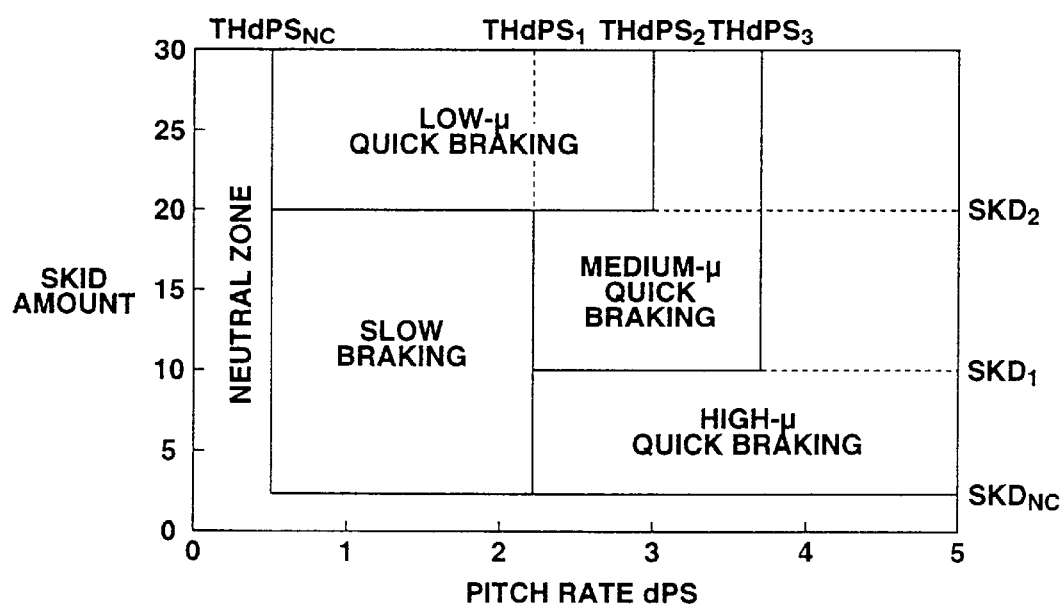
FIG. 31 is a view similar to FIG. 28, illustrating determination of the road-surface frictional coefficient and the brake operating state.

FIGS. 29–31 show a fourth embodiment of the present invention which is substantially the same as the third embodiment except the content of the damping-force characteristic controlling means (see blocks D1–D3 in FIG. 26) in the control unit 4 as shown in FIG. 29.

Referring to FIG. 29, at a block D1, the vehicular pitching stroke amount PS is calculated in accordance with a difference between front- and rear-wheels stroke signals sensed by the stroke sensor 6. At a block E1, the calculated vehicular pitching stroke amount PS is differentiated to obtain a vehicular pitch rate or pitching stroke speed dPS. At a block D2, a processing is carried out to eliminate unnecessary frequency components by a high-pass filter HPF (0.5 Hz) and a low-pass filter LPF (2.0 Hz).

At a block D3 subsequent to the blocks B12 and D2, the road-$\mu$ and the brake operating state are determined based on a signal out of the brake-lamp switch BS, a signal of the vehicular pitch rate dPS, and the skid amount SKD calculated at the block B12 and in accordance with a flowchart as shown in FIG. 30 and a map as shown in FIG. 31.

The flowchart of FIG. 30 and the map of FIG. 31 show the content of determination of the road-$\mu$ and the brake operating state at the block D3 in FIG. 29, which are substantially the same as the flowchart of FIG. 27 and the map of FIG. 28 as described above except that at steps 406, 408, 412, and 415, a signal for determining the brake operating state is obtained from the vehicular pitch rate dPS in place of the vehicular pitching stroke amount PS.

Specifically, at the step 406, it is determined whether or not the vehicular pitch rate dPS is equal to or greater than a predetermined neutral-zone threshold value $THdPS_{NC}$. At the step 408, it is determined whether or not the vehicular pitch rate dPS is equal to or greater than a predetermined first threshold value $THdPS_1$. At the step 412, it is determined whether or not the vehicular pitch rate dPS is equal to or greater than a predetermined third threshold value $THdPS_3$. At the step 415, it is determined whether or not the vehicular pitch rate dPS is equal to or greater than a predetermined second threshold value $THdPS_2$.

Figure 32:
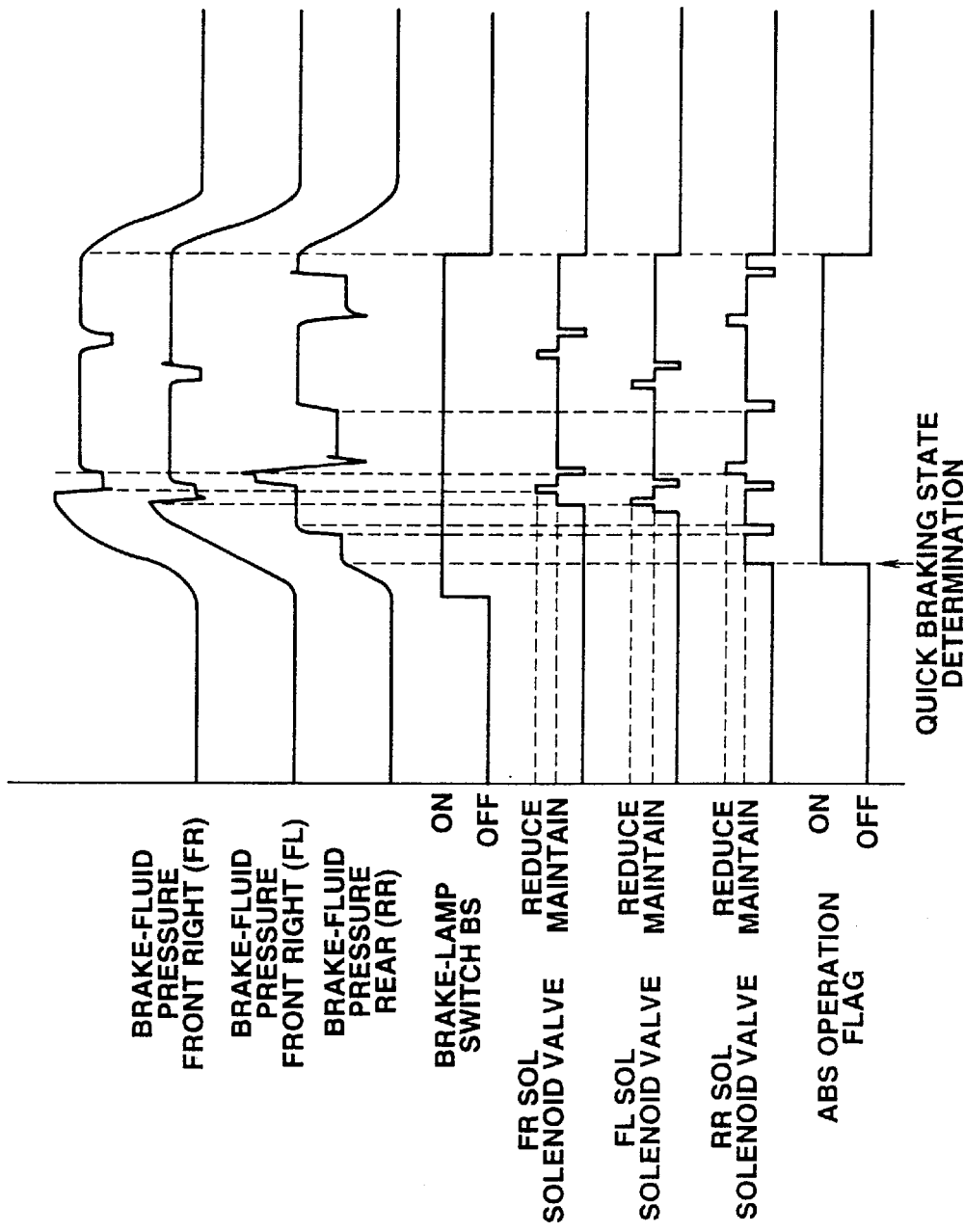
FIG. 32 is a view similar to FIG. 17, showing a fifth embodiment of the present invention.

FIG. 32 shows a fifth embodiment of the present invention wherein brake operating state determining means determine quick braking based on a fluid-pressure preservation signal out of an antiskid controller ABS.

Specifically, referring to FIG. 32, when having brake operation, the brake-lamp switch BS is turned on. Then, if brake operation is so quick that the wheel skid ratio exceeds a predetermined value, the antiskid controller ABS is operated to carry out control (reduction, preservation, and reboost) of the brake-fluid pressure of each of the front-right, front-left, and rear wheels.

After starting of the antiskid controller ABS, quick braking is determined in accordance with a first brake-fluid pressure preservation signal derived from one of brake-fluid pressure control solenoid valves FR-SOL, FL-SOL, RR-SOL for the front-right, front-left, and rear wheels.

Figure 33:
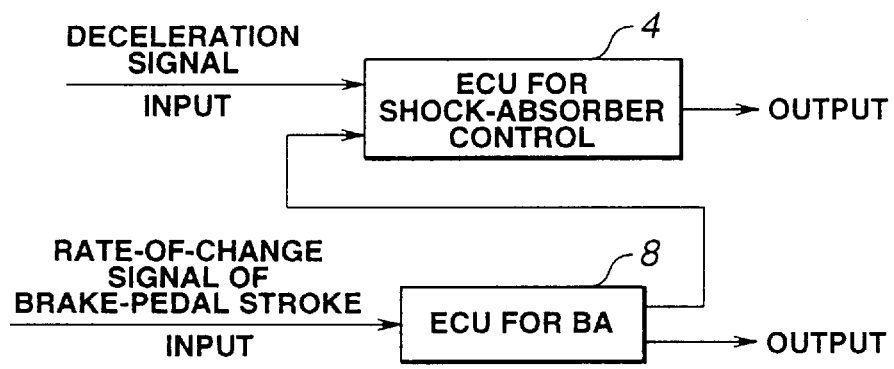
FIG. 33 is a view similar to FIG. 29, showing a sixth embodiment of the present invention.
Figure 34:
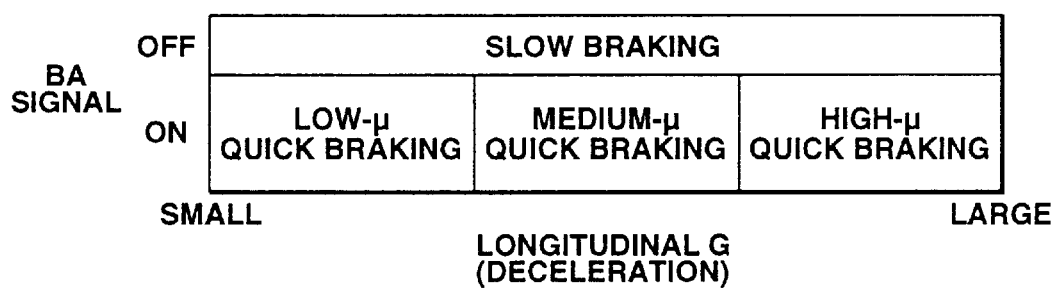
FIG. 34 is a view similar to FIG. 31, illustrating determination of the road-surface frictional coefficient and the brake operating state.
Figure 35:
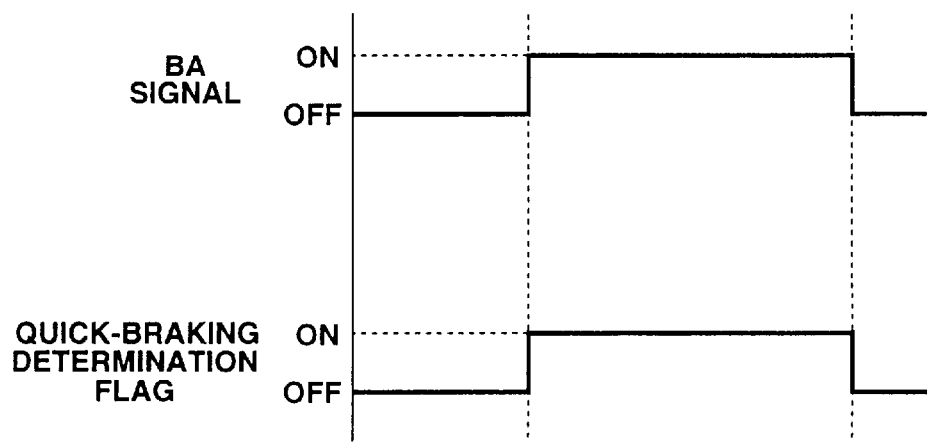
FIG. 35 is a view similar to FIG. 32, showing determination of the brake operating state.

FIGS. 33–35 show a sixth embodiment of the present invention wherein the brake operating state determining means determine quick braking based on a brake assist (BA) signal, and determination of the road-$\mu$ during quick braking is carried out in accordance with a vehicular longitudinal acceleration signal.

Specifically, referring to FIG. 33, a control unit 8 for brake assist receives a signal of the rate of change of the brake-pedal depression stroke or a signal of the rate of increase of the brake-fluid pressure for determining quick braking. When the above signal exceeds a predetermined threshold value, the control unit 8 provides a BA signal to brake-fluid pressure controlling means for staring brake-assist control, and also to a control unit 4 for shock absorbers. Referring to FIGS. 34–35, when the BA signal is turned on, the control unit 4 determines that brake operation is quick.

As shown in FIG. 33, the control unit 4 receives a vehicular deceleration signal out of the longitudinal G sensor 5, in accordance with the magnitude of which, it determines the road-$\mu$ during quick braking as shown in FIG. 34. That is, during quick braking, determination is made such that if a value of a vehicular deceleration signal is small, the road-$\mu$ is small; if it is large, the road-$\mu$ is high; and if it is medium, the road-$\mu$ is medium.

Having described the present invention with regard to the preferred embodiments, it is noted that the present invention is not limited thereto, and various changes and modifications can be made without departing from the scope of the present invention.

By way of example, in the embodiments, a bad-road determination signal is obtained from a sprung vertical acceleration signal. Alternatively, it may be obtained from a high-frequency component signal of a longitudinal acceleration signal sensed by the longitudinal G sensor.

Moreover, in the embodiments, three vertical G sensors are arranged at the front-right, front-left, and rear-right wheels. However, the number of vertical G sensors is not limitative, and it may be four for all wheels, or one or two for the front wheels.

What is claimed is:

1. A method of controlling a suspension system for a motor vehicle with a brake and an antiskid controller, the suspension system including a shock absorber arranged between a vehicle body and a wheel and having a device for allowing a change in a damping-force characteristic, the method comprising the steps of:

sensing a behavior of the motor vehicle;

producing a control signal in accordance with said sensed behavior;

carrying out a normal control of the damping-force characteristic of the shock absorber in accordance with said produced control signal and based on a predetermined damping-force characteristic curve;

determining a brake operating state including determining whether the brake is operated or not;

determining a frictional coefficient of a road surface;

determining a frequency input from said road surface; and reducing variations in a load of the wheel by controlling the damping-force characteristic of the shock absorber in accordance with said brake operating state, said frictional coefficient, and said determined frequency input from said road surface.

2. A method as claimed in claim 1, wherein said brake operating state determining step is carried out with a brake-lamp switch.

3. A method of controlling a suspension system for a motor vehicle with a brake and an antiskid controller, the suspension system including a shock absorber arranged between a vehicle body and a wheel and having a device for allowing a change in a damping-force characteristic, the method comprising the steps of:

sensing a behavior of the motor vehicle;

producing a control signal in accordance with said sensed behavior;

carrying out normal control of the damping-force characteristic of the shock absorber in accordance with said produced control signal and based on a predetermined damping-force characteristic curve;

determining a brake operating state;

determining a frictional coefficient of a road surface;

determining a frequency input from said road surface; and reducing variations in a load of the wheel by controlling the damping-force characteristic of the shock absorber in accordance with said brake operating state, said frictional coefficient, and said determined frequency input from said road surface, wherein said brake operating state determining step is carried out with a brake-lamp switch, and wherein when said brake-lamp switch is turned on, said variations reducing step is carried out to switch said normal control to a braking control wherein the damping-force characteristic of the shock absorber, at least on an actual stroke side, is fixed to a hard state.

4. A method as claimed in claim 3, wherein when two conditions are satisfied that said brake operating state determined in quick and said frictional coefficient determined is high, said braking control is preserved during a predetermined period of time, then returned to said normal control.

5. A method as claimed in claim 3, wherein when one of two conditions is satisfied that said brake operating state determined is slow and said frictional coefficient determined is low, said braking control is released immediately and returned to said normal control.

6. A method as claimed in claim 2, wherein when said brake-lamp switch is turned on and that said frequency determined is high, said variations reducing step is carried out to switch said normal control to a braking control wherein the damping-force characteristic of the shock absorber at least on an actual stroke side is fixed to a hard state.

7. A method as claimed in claim 4, wherein said predetermined period of time corresponds to one operation cycle of the antiskid controller.

8. A method as claimed in claim 7, further comprising the step of sensing a skid amount of the wheel.

9. A method as claimed in claim 8, wherein said predetermined period of time extends from a point that said skid amount sensed is greater than a predetermined first threshold value to a point that said skid amount sensed is smaller than a predetermined second threshold value.

10. A method as claimed in claim 8, wherein as said brake operating state determined is quicker and said frictional coefficient determined is higher, a control gain of the damping-force characteristic based on said normal control is higher.

11. A method as claimed in claim 1, wherein said behavior sensing step is carried out with a sensor for sensing a sprung vertical speed of the motor vehicle.

12. A method as claimed in claim 11, wherein when a direction discrimination sign of said sprung vertical speed is positive, said normal control carrying out step is carried out to control the damping-force characteristic of the shock absorber on a tension stroke side.

13. A method as claimed in claim 11, wherein when a direction discrimination sign of said sprung vertical speed is negative, said normal control carrying out step is carried out to control the damping-force characteristic of the shock absorber on a compression stroke side.

14. A method as claimed in claim 1, wherein said frequency determining step is carried out with a sprung vertical acceleration sensor for sensing a sprung vertical acceleration of the motor vehicle.

15. A method as claimed in claim 14, wherein a low-frequency component of said frequency determined is obtained from said sprung vertical acceleration, and a high-frequency component of said frequency determined is obtained from a wheel speed sensed by a wheel-speed sensor.

16. A method as claimed in claim 15, wherein said brake operating state determining step is carried out in accordance with a signal resulting from a difference between sprung vertical accelerations sensed by at least one pair of sprung vertical acceleration sensors mounted in front and rear positions of the vehicle body, and a signal resulting from said wheel speed.

17. A method as claimed in claim 15, wherein said frictional coefficient determining step is carried out in accordance with said wheel speed.

18. A method as claimed in claim 17, wherein said frictional coefficient determining step is carried out with wheel-speed sensors with respect to right and left wheels.

19. A method of controlling a suspension system for a motor vehicle with a brake and an antiskid controller, the suspension system including a shock absorber arranged between a vehicle body and a wheel and having a device for allowing a change in a damping-force characteristic, the method comprising the steps of:

sensing a behavior of the motor vehicle;

producing a control signal in accordance with said sensed behavior;

carrying out a normal control of the damping-force characteristic of the shock absorber in accordance with said control signal produced and based on a predetermined damping-force characteristic curve;

determining a brake operating state;

determining a frictional coefficient of a road surface;

determining a frequency input from said road surface; and reducing variations in a load of the wheel by controlling the damping-force characteristic of the shock absorber in accordance with said brake operating state, said frictional coefficient, frequency determined, wherein said brake operating state determining step, said frictional coefficient determining step, and said frequency determining step are carried out in accordance with a longitudinal acceleration of the motor vehicle sensed by a longitudinal acceleration sensor and a front wheel speed sensed by a front wheel sensor.

20. A method as claimed in claim 19, further comprising the step of obtaining low- and high-frequency components of a signal of said longitudinal acceleration.

21. A method as claimed in claim 20, wherein said brake operating state and said frictional coefficient are determined in accordance with said low-frequency component and said front wheel speed, and said frictional coefficient is determined in accordance with said high-frequency component.

22. A method as claimed in claim 21, wherein said skid amount of the wheel at least on the front side is calculated in accordance with said front wheel speed, said frictional coefficient is determined in accordance with said skid amount calculated, said frequency is determined in accordance with said high-frequency component, and said brake operating state is determined in accordance with said low-frequency component.

* * * * *